(12) United States Patent
Fujita et al.

(10) Patent No.: US 10,833,607 B2
(45) Date of Patent: Nov. 10, 2020

(54) ELECTRET ELEMENT, ELECTROMECHANICAL CONVERTER AND METHOD FOR MANUFACTURING ELECTRET ELEMENT

(71) Applicants: The University of Tokyo, Tokyo (JP); SAGINOMIYA SEISAKUSHO, INC., Tokyo (JP)

(72) Inventors: Hiroyuki Fujita, Tokyo (JP); Gen Hashiguchi, Tokyo (JP); Hisayuki Ashizawa, Sayama (JP); Hiroyuki Mitsuya, Sayama (JP); Kazunori Ishibashi, Sayama (JP)

(73) Assignees: The University of Tokyo, Tokyo (JP); Saginomiya Seisakusho, Inc., Tokyo (JP)

( * ) Notice: Subject to any disclaimer, the term of this patent is extended or adjusted under 35 U.S.C. 154(b) by 217 days.

(21) Appl. No.: 15/550,215

(22) PCT Filed: Feb. 9, 2016

(86) PCT No.: PCT/JP2016/053836
§ 371 (c)(1),
(2) Date: Aug. 10, 2017

(87) PCT Pub. No.: WO2016/129597
PCT Pub. Date: Aug. 18, 2016

(65) Prior Publication Data
US 2018/0041140 A1 Feb. 8, 2018

(30) Foreign Application Priority Data

Feb. 13, 2015 (JP) .................. 2015-026839

(51) Int. Cl.
*H02N 1/10* (2006.01)
*H02N 1/00* (2006.01)
*H01G 7/02* (2006.01)

(52) U.S. Cl.
CPC ............. *H02N 1/10* (2013.01); *H01G 7/025* (2013.01); *H02N 1/008* (2013.01); *Y10T 29/49226* (2015.01)

(58) Field of Classification Search
CPC .......... H02N 1/008; H02N 1/10; H01G 7/025; Y10T 29/49226
(Continued)

(56) References Cited

U.S. PATENT DOCUMENTS

2006/0127085 A1    6/2006   Matsuki et al.
2014/0065318 A1    3/2014   Suzuki et al.
(Continued)

FOREIGN PATENT DOCUMENTS

CN      1839434 A      9/2006
CN    105453408 A      3/2016
(Continued)

OTHER PUBLICATIONS

International Search Report (PCT/ISA/210) issued in PCT Application No. PCT/JP2016/053836 dated Apr. 26, 2016 with English translation (Four (4) pages).
(Continued)

*Primary Examiner* — Shawki S Ismail
*Assistant Examiner* — Monica Mata
(74) *Attorney, Agent, or Firm* — Crowell & Moring LLP

(57) ABSTRACT

An electret element includes: an Si layer, an $SiO_2$ layer formed at a surface of the Si layer; and an electret formed at the $SiO_2$ layer near an interface of the $SiO_2$ layer and the Si layer.

8 Claims, 21 Drawing Sheets

(58) Field of Classification Search
USPC .......................................................... 310/309
See application file for complete search history.

(56) References Cited

U.S. PATENT DOCUMENTS

2016/0118912 A1* 4/2016 Hayashi ................ B81C 99/002
                                                                                 310/309
2016/0204716 A1    7/2016 Suzuki et al.

FOREIGN PATENT DOCUMENTS

| EP | 2 704 170 A2 | 3/2014 |
|---|---|---|
| JP | 9-283373 A | 10/1997 |
| JP | 2004-114261 A | 4/2004 |
| JP | 2013-13256 A | 1/2013 |
| JP | 5551914 B2 | 7/2014 |
| JP | 5627130 B2 | 11/2014 |
| WO | WO 2015/019919 A1 | 2/2015 |

OTHER PUBLICATIONS

Japanese-language Written Opinion (PCT/ISA/237) issued in PCT Application No. PCT/JP2016/053836 dated Apr. 26, 2016 (Four (4) pages).

\* cited by examiner

ELECTRET ELEMENT, ELECTROMECHANICAL CONVERTER AND METHOD FOR MANUFACTURING ELECTRET ELEMENT

TECHNICAL FIELD

The present invention relates to an electret element, an electromechanical converter and a method for manufacturing an electret element.

BACKGROUND ART

As conventional methods for fixing an electric charge in an insulating film constituted of, for instance, $SiO_2$, a method for injecting an electric charge to the insulating film from the surface thereof by using a "corona discharge" or by using an "electron beam" is known (see, for instance, PTL1). However, since narrow-gap areas such as the side surfaces of a comb tooth structure cannot be charged with ease through this method, assembly is normally performed after the charge processing. This makes it difficult to narrow the gap, which is bound to restrict the level of performance of a power generating device, an actuator or the like.

As a way of addressing this issue, a method for charging narrow-gap areas whereby the air is ionized with a soft x-ray and the resulting ions are injected into the narrow-gap areas with a bias voltage, has been proposed (see, for instance, PTL2).

Moreover, ions of an alkali metal, such as potassium ions, which has been injected in an $SiO_2$ layer may be caused to move and fixed by applying a bias voltage at high temperature (see, for instance, PTL3).

CITATION LIST

Patent Literature

PTL1: Japanese Laid Open Patent Publication No. H9-283373
PTL2: Japanese Patent No. 5551914
PTL3: Japanese Patent No. 5627130

SUMMARY OF INVENTION

Technical Problem

The method described in PTL2 requires a state in which an electric field is applied to the charge-target area to be sustained during the charge processing. For instance, in order to charge comb teeth to their roots, the comb teeth of one must be fully inserted into the gaps between the teeth of the other and remain so inserted. However, as the charge processing progresses, the electrostatic force decreases, resulting in a decrease in the extent of teeth insertion. This means that a special mechanism for holding the comb teeth is required in order to sustain the extent of insertion. In addition, since the processing requires air, a sealed area cannot be effectively charged.

Furthermore, in all the methods cited above, the electric charge is injected from the surface, making it difficult to control the position at which the charge is fixed (the depth from the surface). Thus, a uniform charge cannot be achieved at a position deep into an insulating material. An electric charge fixed near the surface will tend to become neutralized through a reaction with water vapor in the air and thus, the service life of the electret will be shortened.

While ions of an alkali metal are used in the method disclosed in PTL3, alkali metals, which degrade the electrical characteristics of semiconductor elements, are normally kept out of a manufacturing apparatus. This means that since an electret cannot be formed in part of a CMOS device by using this method, the method is bound to limit the application range. In addition, since ions of an alkali metal are fixed at positions close to the $SiO_2$ surface, the method requires additional processing such as water-repellent film formation processing, in order to ensure the service life of the electret is not shortened.

Solution to Problem

According to the first aspect of the present invention, an electret element, comprises: an Si layer, an $SiO_2$ layer formed at a surface of the Si layer; and an electret formed at the $SiO_2$ layer near an interface of the $SiO_2$ layer and the Si layer.

According to the second aspect of the present invention, an electromechanical converter provides a first electrode and a second electrode disposed so as to face opposite each other, at least one of which is allowed to move, wherein: the first electrode is constituted with the electret element according to the first aspect; and electric energy is converted to mechanical energy and vice versa as at least either the first electrode or the second electrode moves.

According to the third aspect of the present invention, in the electromechanical converter according to the second aspect, it is preferred that the Si layer is constituted with an Si substrate; and at least a part of a circuit element used to drive the electromechanical converter is formed at the Si substrate.

According to the fourth aspect of the present invention, in the electromechanical converter according to the second or third aspect, it is preferred that power is generated as at least either the first electrode or the second electrode is caused to move by an external force.

According to the fifth aspect of the present invention, in the electromechanical converter according to the second or third aspect, it is preferred that to further comprises a stationary unit having the first electrode disposed thereat, a movable unit having the second electrode disposed thereat, a voltage source that applies a voltage between the first electrode and the second electrode; and a control unit that drives the movable unit by controlling the voltage applied by that voltage source.

According to the sixth aspect of the present invention, a method for manufacturing an electret element, comprises: applying a voltage between an Si layer, with an $SiO_2$ layer formed thereat, and the $SiO_2$ layer while sustaining the Si layer at a first temperature at which the $SiO_2$ layer is rendered in a semiconductor state; and changing temperatures at the Si layer with the $SiO_2$ layer formed thereat from the first temperature to a second temperature at which the $SiO_2$ layer regains an insulating property in a state of continuous voltage application.

Advantageous Effects of Invention

According to the present invention, an electret element that includes an electret assuring an outstanding service life can be provided.

DESCRIPTION OF EMBODIMENTS

Following is a description of embodiments of the present invention, given in reference to drawings.

First Embodiment

The electret element according to the first embodiment includes an Si layer and an $SiO_2$ layer, which are formed through an interface, and an electret is formed near the interface of the $SiO_2$ layer side. The present inventors discovered the electrical characteristics manifesting at the Si/SiO$_2$ interface as will be described below and formed an electret in the $SiO_2$ layer by making use of the electrical characteristics.

Figure 1:
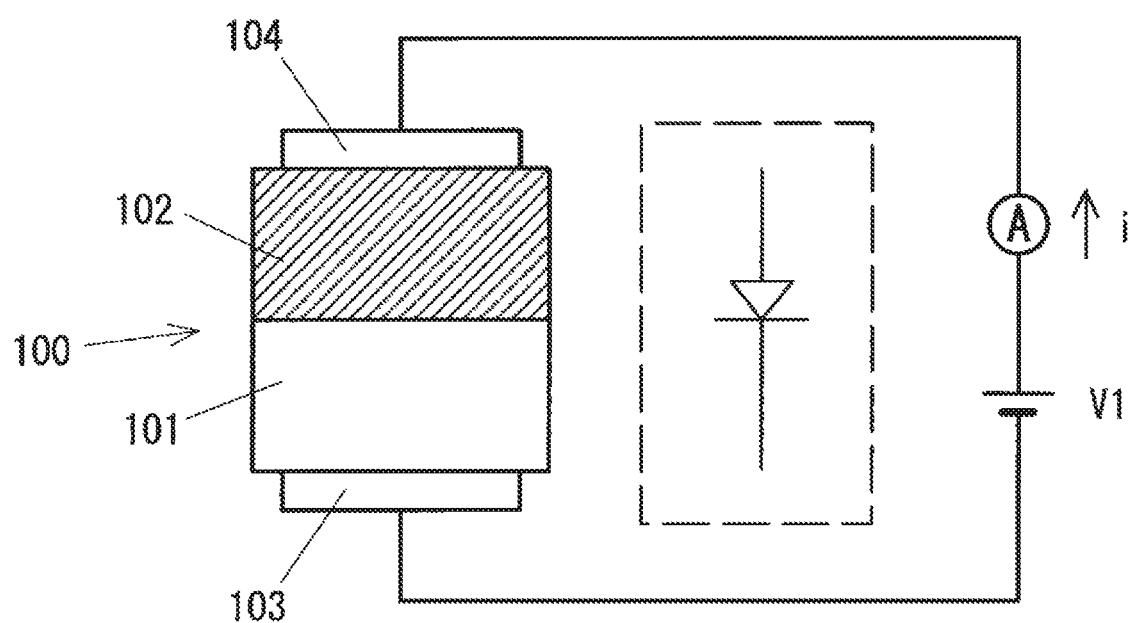
FIG. 1 is an illustration of the electret element according to a first embodiment.

A test piece 100 in FIG. 1 includes an $SiO_2$ layer 102 formed at a surface of an Si layer 101 on one side thereof. An Au layer 103 and an Au layer 104, which are to function as electrodes, are respectively formed at the Si layer 101 and the $SiO_2$ layer 102. When Si is heated to high temperature (approximately 500 to 700° C.), the intrinsic carrier concentration increases, resulting in a lower electric resistivity, and thus it can be regarded as a conductor. In addition, $SiO_2$, which is an excellent insulator at room temperature, is known to be affected by thermally excited electrons at high temperature (approximately 500 to 700° C.), to result in its electric resistivity being reduced to as low as the order of $10^4$ Ωm (setting it substantially in the range of a semiconductor).

Accordingly, the present inventors manufactured the test piece 100 having the Si/SiO$_2$ interface, as shown in FIG. 1, and investigated the electrical characteristics manifesting at the Si/SiO$_2$ interface at high temperature (approximately 610° C.). It was revealed, as indicated by the relationship between an applied voltage V1 and an electric current i in FIG. 2, that a rectifying effect similar to that in a Schottky junction, is achieved at the Si/SiO$_2$ interface in high temperature conditions.

(Principle of Charge)

Figure 3:
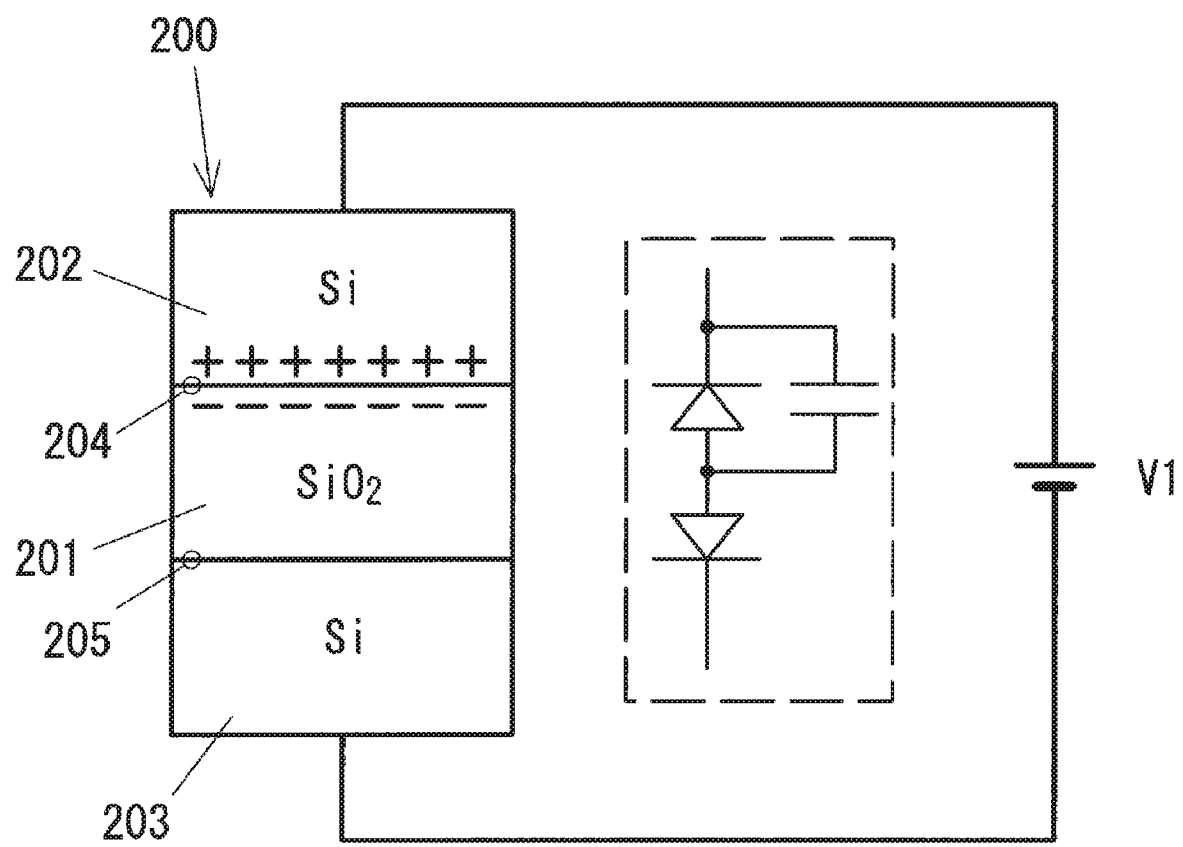
FIG. 3 is a diagram illustrating the principle of charge at the electret element according to the present embodiment.

FIG. 3 illustrates the principle of charge at the electret element according to the present embodiment. With the voltage V1 applied as shown in FIG. 3 while a substrate (e.g., an SOI (silicon-on-insulator) substrate) 200 constituted with an $SiO_2$ layer 201 interposed between Si layers 202 and 203, is sustained in the heated state with its temperature kept high (500 to 700° C.), at which $SiO_2$ is rendered into a semiconductor-like state, an electric double layer is formed on the two sides of an Si/SiO$_2$ interface 204. It is to be noted that while Si layers impurities has been doped are normally used, they may be either the p-type or the n-type. As an alternative, Si layers with no impurity content may be used.

Figure 2:
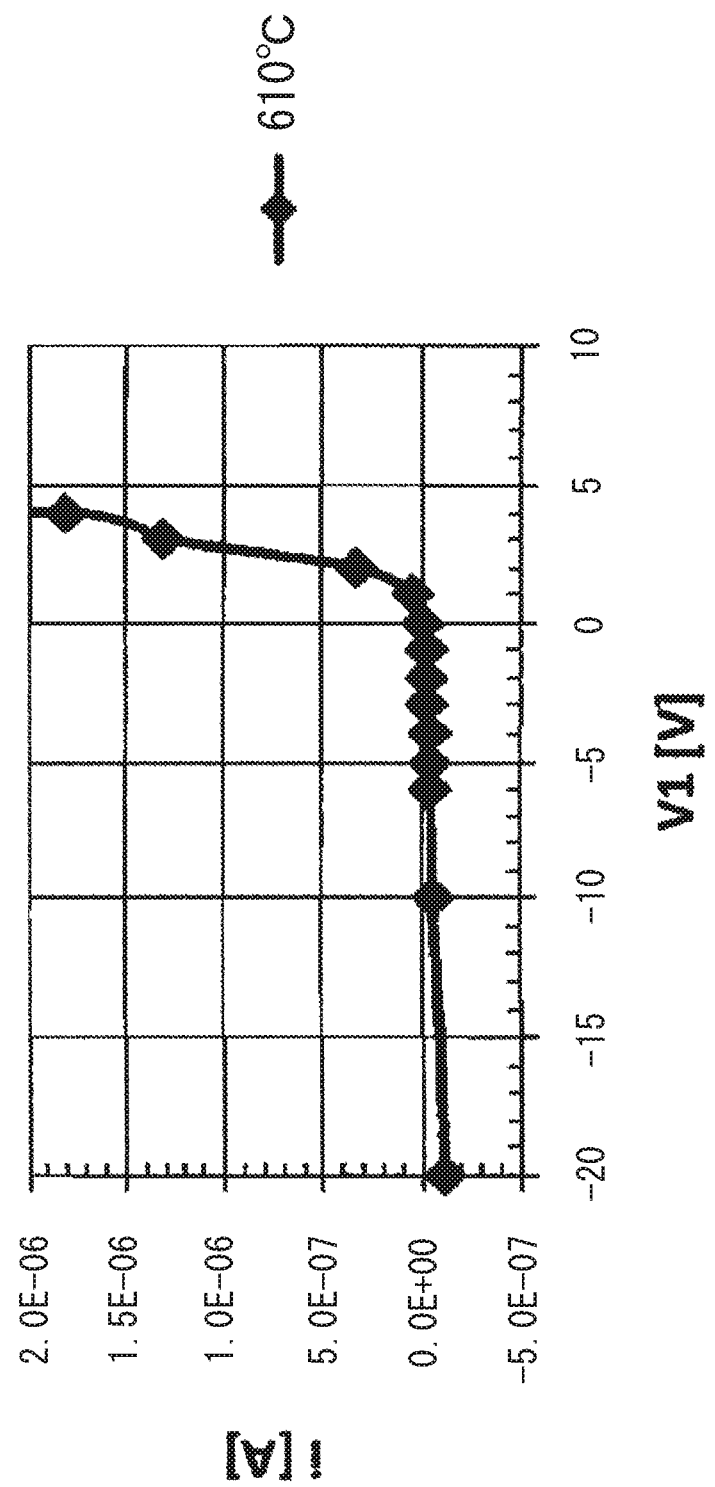
FIG. 2 is a diagram indicating electrical characteristics manifesting at an Si/SiO2 interface.

As explained earlier, a rectifying effect, such as that illustrated in FIG. 2, manifests at an Si/SiO$_2$ interface in high temperature conditions. Thus, a positive charge is accumulated where the Si layer 202 is present on one side of the upper Si/SiO$_2$ interface 204 and a negative charge is accumulated where the $SiO_2$ layer 201 is present on the other side of the Si/SiO$_2$ interface 204. However, at the lower Si/SiO$_2$ interface where the voltage is applied along a direction in which the electric current flows, no electric double layer is formed.

Figure 4:
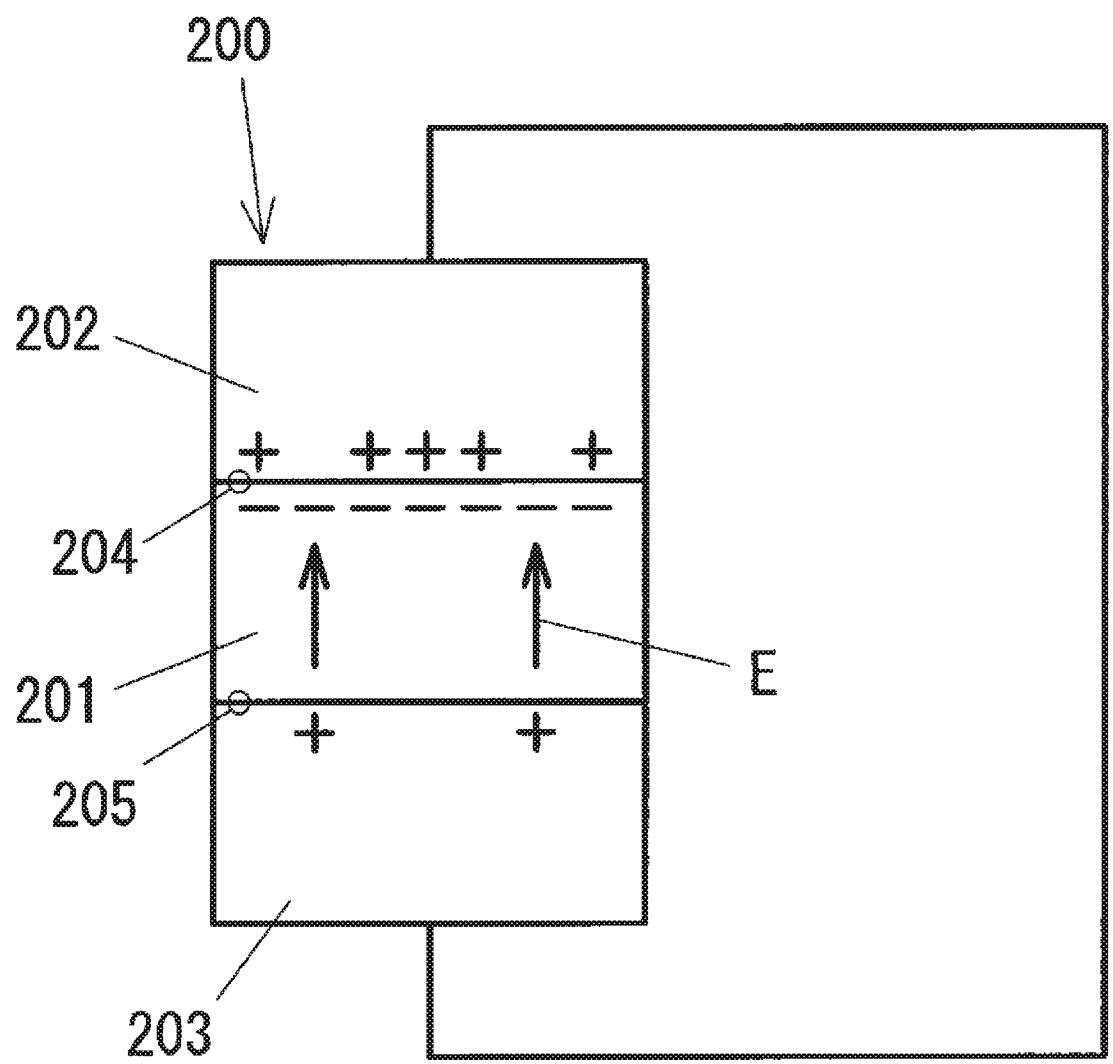
FIG. 4 is a diagram illustrating the principle with which charge occurs at the electret element according to the present embodiment when no voltage is applied.

Next, as the temperature of the substrate 200 is reset to room temperature while the voltage application is sustained, i.e., as its temperature is lowered to a level at which the $SiO_2$ layer 201 regains its insulating property, the negative charge having been accumulated in the $SiO_2$ layer 201 side of the Si/SiO$_2$ interface 204 becomes trapped, unable to move. Subsequently, as the application of the voltage V1 stops and the Si layer 202 and the Si layer 203 become connected with each other, part of the positive charge moves from the Si layer 202 to the Si layer 203, as illustrated in FIG. 4.

On the other hand, the negative charge within the $SiO_2$ layer 201 having regained its insulating property remains trapped near the Si/SiO$_2$ interface 204 even after the application of the voltage V1 stops. As a result, an electric field E is formed within the $SiO_2$ layer 201, as illustrated in FIG. 4. This electric field E is a field induced with an electret, and the potential difference between the Si/SiO$_2$ interface 204 and an Si/SiO$_2$ interface 205 is V1. Namely, an electret with the voltage V1 is formed.

Figure 5:
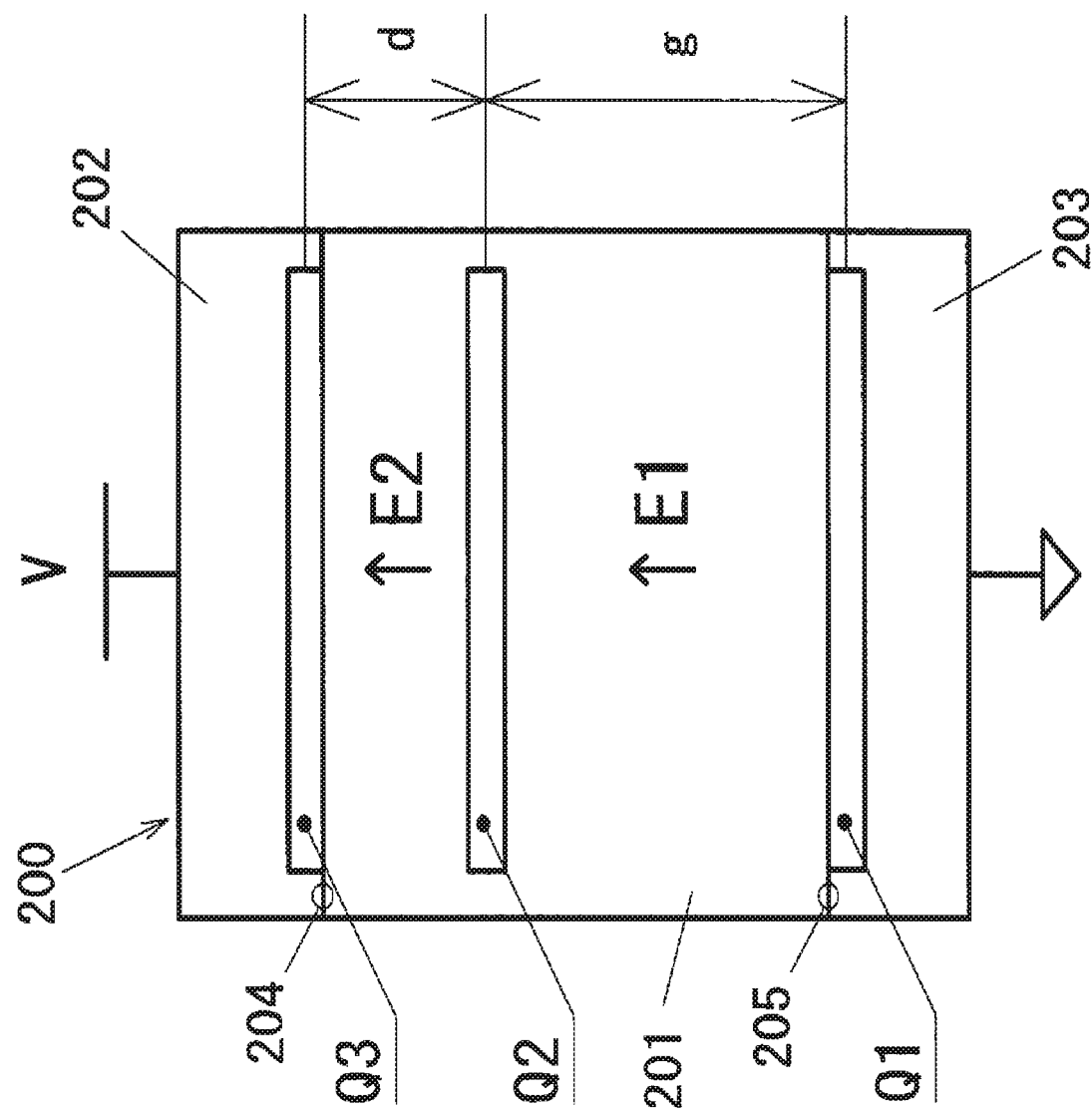
FIG. 5 is a diagram illustrating the charge processing in detail.

The amount of charge and the like will be described in detail in reference to FIGS. 5 through 7. FIG. 5 is a schematic illustration of the structure having an $SiO_2$ layer interposed between Si layers. Surface charges Q2 and Q3 are charges that form the electric double layers shown in FIG. 4. While a distance d between the surface charges Q2 and Q3 at the electric double layer is extremely small, the distance d in FIG. 5 is exaggerated for clarity and it is assumed that the surface charge Q2 is fixed at the position indicated in the figure within the SiO$_2$ layer 201. FIG. 5 also shows a surface charge Q1 in the Si layer 203 and the entire structure is assumed to be electrically neutral. Thus, it is assumed that a non-zero potential is achieved only at the electric fields E1 and E2 within the SiO$_2$ layer 201 and that the potential difference between the Si layers 202 and 203, attributable to the electric fields E1 and E2, is V.

Next, distribution of the surface charges Q1 and Q3 will be explained. The following equations (1) through (3) can be written by applying Gauss's Law, with respect to the region ranging over the two sides of the surface charge Q1, the region ranging over the two sides of the surface charge Q2 and the region ranging over the two sides of the surface charge Q3. It is to be noted that S represents the cross-sectional areas of the SiO$_2$ layer 201 and Si layers 202 and 203 and ε1 represents the dielectric constant of the SiO$_2$ layer 201.

$$\varepsilon 1 \cdot E1 \cdot S = Q1 \quad (1)$$

$$(\varepsilon 1 \cdot E2 - \varepsilon 1 \cdot E1) \cdot S = Q2 \quad (2)$$

$$-\varepsilon 1 \cdot E2 \cdot S = Q3 \quad (2)$$

In addition, since the potential difference between the upper Si layer and the lower Si layer is V, the relationship expressed in the following equation (4) is true. Here, d represents the distance between the surface charges Q2 and Q3 and g represents the distance between the surface charges Q1 and Q2

$$g \cdot E1 + d \cdot E2 = -V \quad (4)$$

By reorganizing equations (1) through (4), the following equations (5) and (6) can be written, enabling calculation of the surface charges Q1 and Q3.

$$Q1 = -d \cdot Q2/(g+d) - \varepsilon 1 \cdot S \cdot V/(g+d) \quad (5)$$

$$Q3 = -Q2 - Q1 \quad (6)$$

Next, in reference to FIG. 6, the relationship between the voltage V applied during the charge processing and the surface charge Q2 will be explained. Since the applied voltage V is set so that V=V1 and electric current flows through the Si/SiO$_2$ interface 205 as indicated in FIG. 2, the following equations (7) and (8) are true in the conditions illustrated in FIG. 6. The following equation (9) can be written by incorporating equations (7) and (8) in equation (5). Q2 calculated as expressed in this equation is a fixed surface charge accumulated in the SiO$_2$ layer 201 and forms an electret. If the applied voltage V1 is V1>0, Q2<0 is satisfied. In FIG. 6, the change in the potential occurring along the layering direction is indicated on the right side of the substrate 200. In the example presented in FIG. 6, an electric double layer is formed at the Si/SiO$_2$ interface 204 and the voltage V1 concentrates in this electric double layer.

$$V = V1 \quad (7)$$

$$Q1 = 0 \quad (8)$$

$$Q2 = -\varepsilon 1 \cdot S \cdot V1/d \quad (9)$$

Next, the surface charges at room temperature following the charge processing shown in FIG. 4 will be explained. It is to be noted that since the SiO$_2$ layer 201 regains its insulating property and the charge remains trapped therein at room temperature, the surface charge Q2 retains the value calculated as expressed in equation (9). The surface charge Q1 can be calculated as expressed in equation (10) by substituting equation (9) into equation (5).

$$Q1 = -\varepsilon 1 \cdot S \cdot (V1 - V)/(g+d) \quad (10)$$

Figure 6:
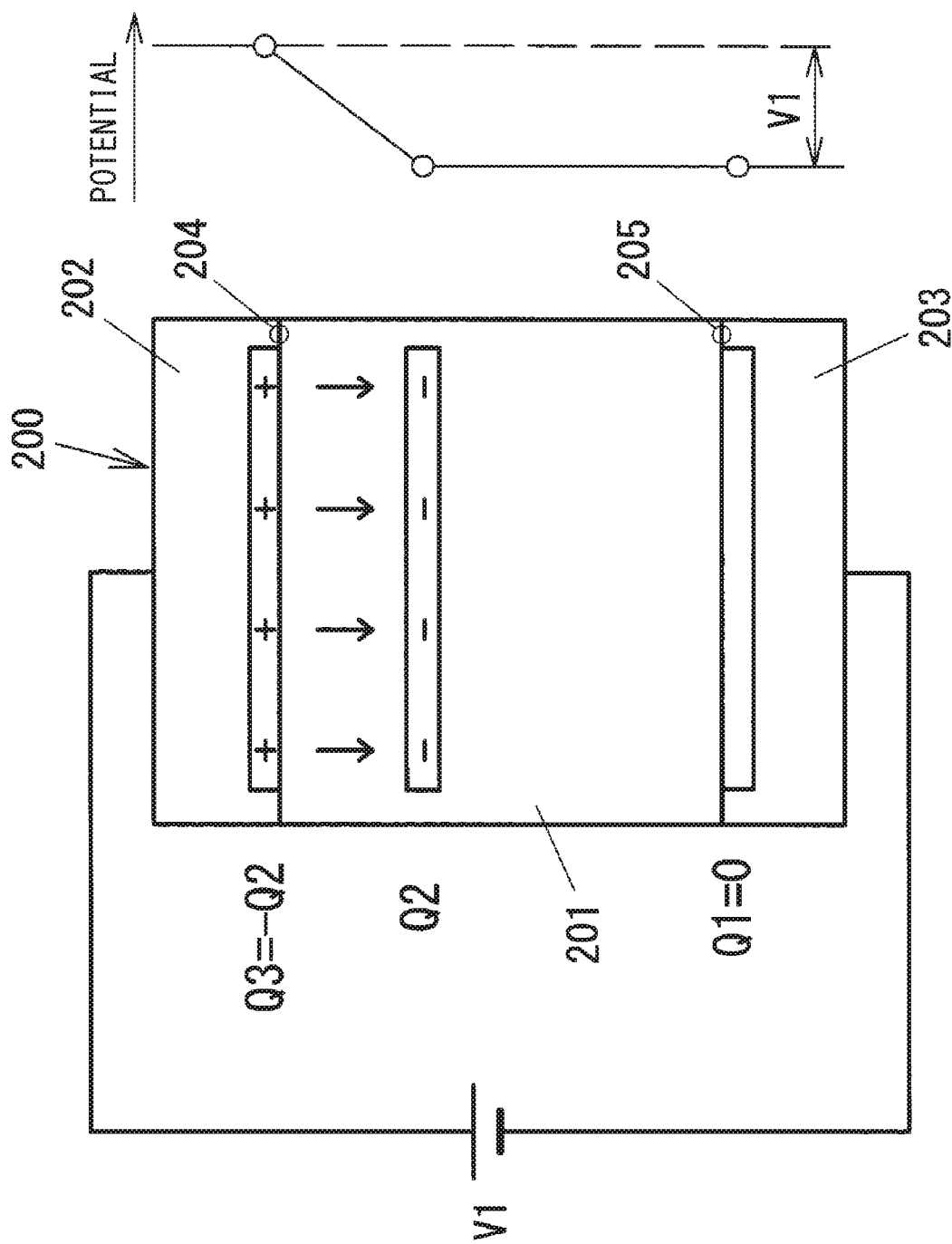
FIG. 6 is a diagram illustrating the charge processing in detail.
Figure 7:
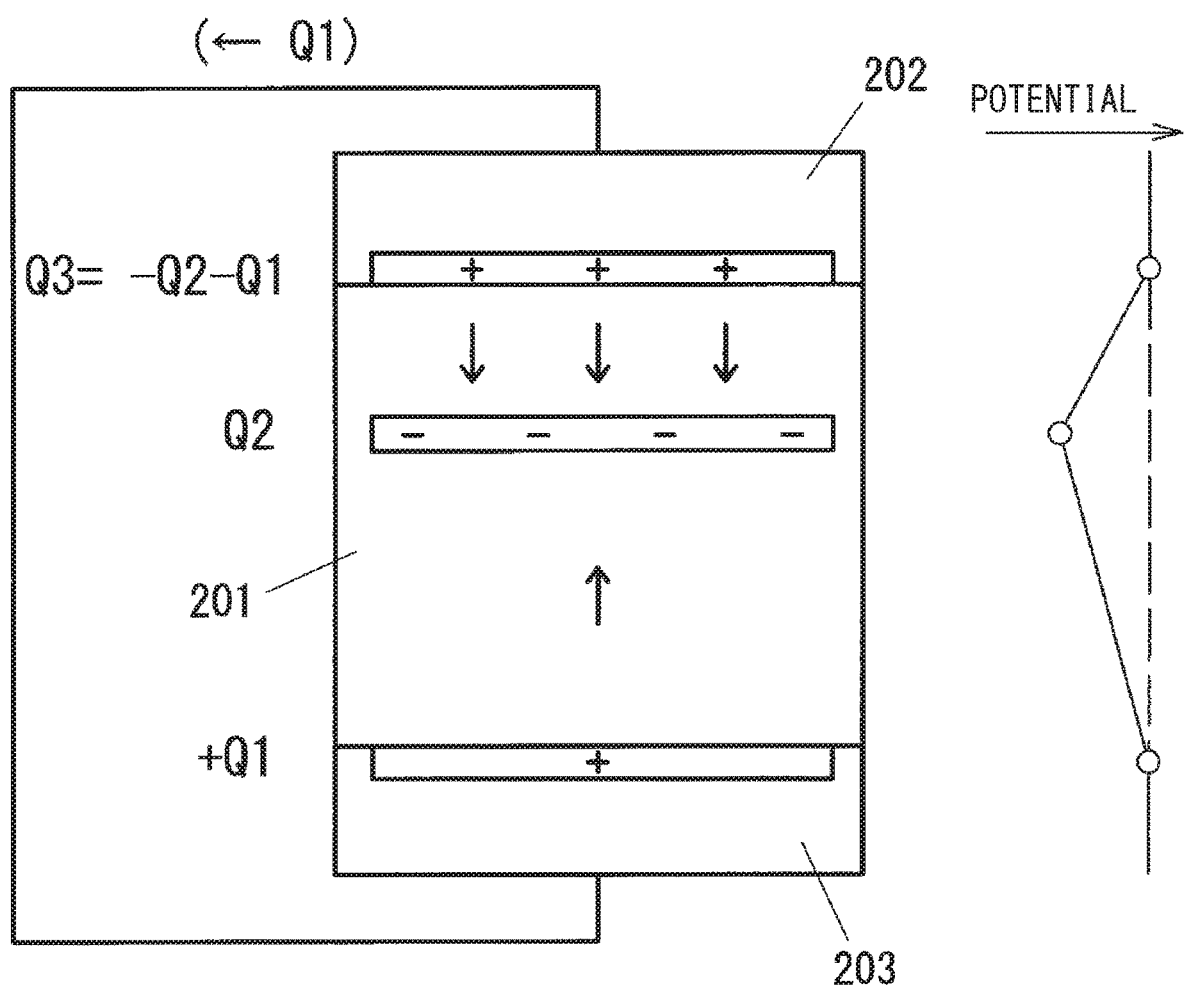
FIG. 7 is a diagram illustrating the charge processing in detail.

While the Si layer 202 and the Si layer 203 manifest the potential difference V1 in the condition illustrated in FIG. 6, this potential difference causes a positive charge to move from the Si layer 202 to the Si layer 203, to result in a smaller potential difference if the Si layer 202 and the Si layer 203 are connected as illustrated in FIG. 7. Equation (10) above expresses the extent to which the positive charge moves as the potential difference changes from V1 to V. Ultimately, the potential difference V becomes equal to 0, as indicated in FIG. 7, and thus, the surface charge Q1 in the Si layer 203 can be calculated as expressed in equation (11) below.

$$Q1 = \varepsilon 1 \cdot S \cdot V1/(g+d) \quad (11)$$

It is to be noted that comparison of equation (10) and equation (9) reveals that the relationship expressed in (12) below is true when |V|<|V1| and d<<g.

$$|Q1| << |Q2| \quad (12)$$

The value of the surface charge Q3, on the other hand, is represented by the sum of an electric charge −Q2 induced via the surface charge Q2 and an electric charge −Q1 attributable to an outflow of the very small charge Q1, as indicated in equation (6). This allows to be represented by a basic conceptual image of an electric double layer {Q2, −Q2} having a high charge density, with a small charge Q1 moving between the upper and lower Si layers in correspondence to the potential difference.

An advantage of such an electret is in that Q1≠0 (i.e., electric field E1≠0) is true when the potential difference V=0, as indicated in FIG. 7. As equation (11) indicates, the intensity of the electric field E1 generated in this situation is equal to the intensity of an electric field that would be generated by applying an external bias voltage V1 when there is no electret (Q2=0). This allows for an expression "the charging voltage at the electret is V1".

It is to be noted that while the example presented in FIG. 7 does not provide a high use value since the electric field E1 remains within the SiO$_2$ layer 201, an electric field can be generated in a gap space by executing charge processing on a specific structure, as will be described later. Such an electric field generated in the gap space will enable electromechanical conversion (conversion from electric energy to mechanical energy and vice versa), which will allow to be adopted in power generation, sensors, actuators and the like.

Second Embodiment

Figure 8:
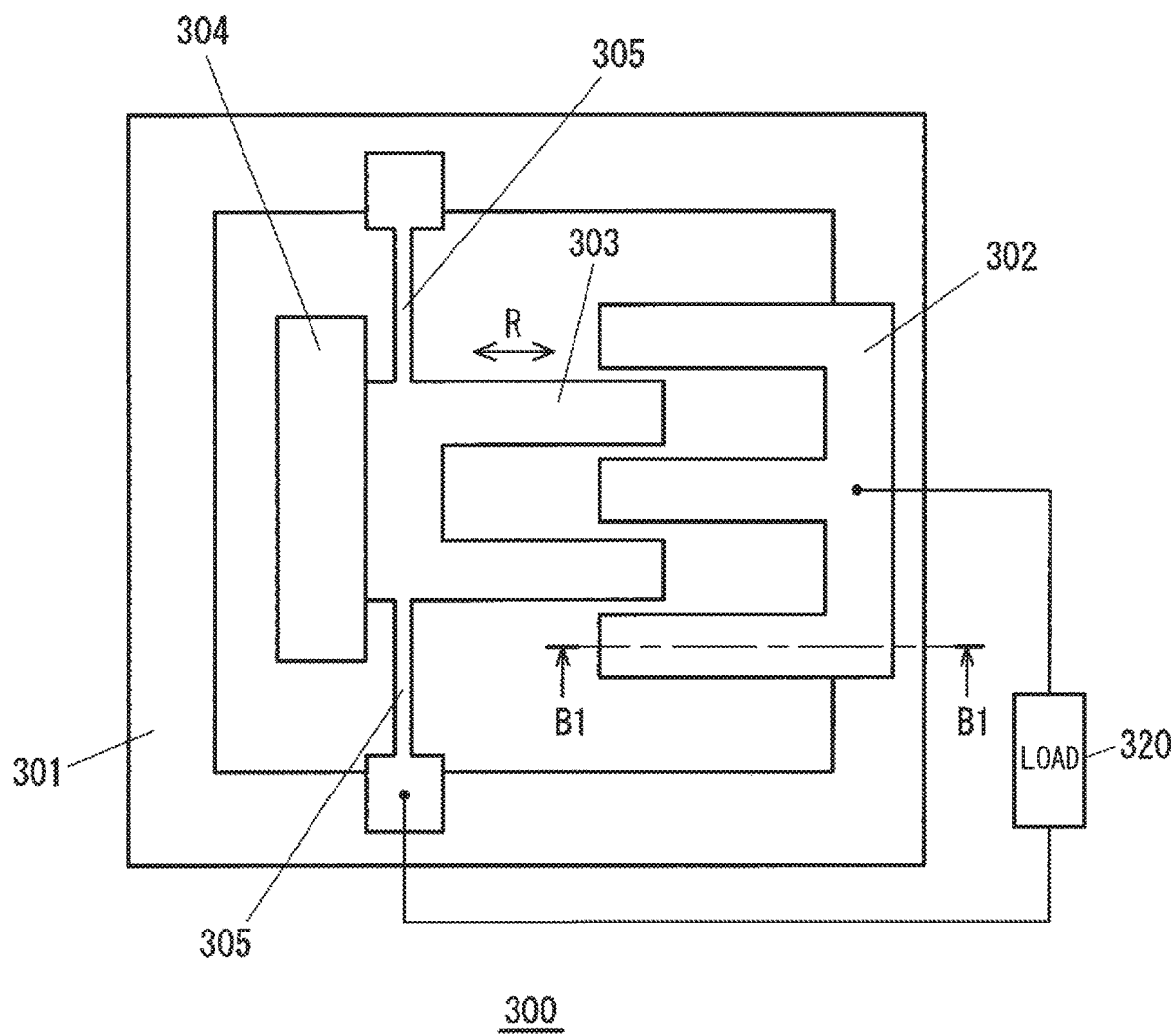
FIG. 8 is a schematic illustration of the structure of a vibration energy harvesting device.

In the second embodiment, the electret element according to the first embodiment is adopted in a vibration energy harvesting device assuming a comb tooth structure, representing an example of an electromechanical converter. FIG. 8 schematically illustrates the structure of a vibration energy harvesting device 300. As is the electret element in the first embodiment, the vibration energy harvesting device 300 is formed by processing an SOI substrate through a semiconductor integrated circuit manufacturing technology similar to that for standard MEMS (e.g., deep etching through ICP-RIE).

The vibration energy harvesting device 300 includes a fixed comb-tooth electrode 302 and a movable comb-tooth electrode 303, both disposed upon a rectangular ring-shaped pedestal 301. The movable comb-tooth electrode 303 is elastically supported on the pedestal 301 via an elastic support portion 305. The individual comb teeth of the movable comb-tooth electrode 303 are set with gaps between the comb teeth of the fixed comb-tooth electrode 302. A weight 304 is disposed at the movable comb-tooth electrode 303. As a vibration originating outside is applied to the vibration energy harvesting device 300, the movable comb-tooth electrode 303 vibrates along the direction indicated by the arrow R. A load 320 is connected between the fixed comb-tooth electrode 302 and the movable comb-tooth electrode 303. As will be described later, an electret is formed at the fixed comb-tooth electrode 302, and as an external force is applied to the vibration energy harvesting device 300 and vibration occurs at the movable comb-tooth electrode 303, electric power is generated.

Figure 9:
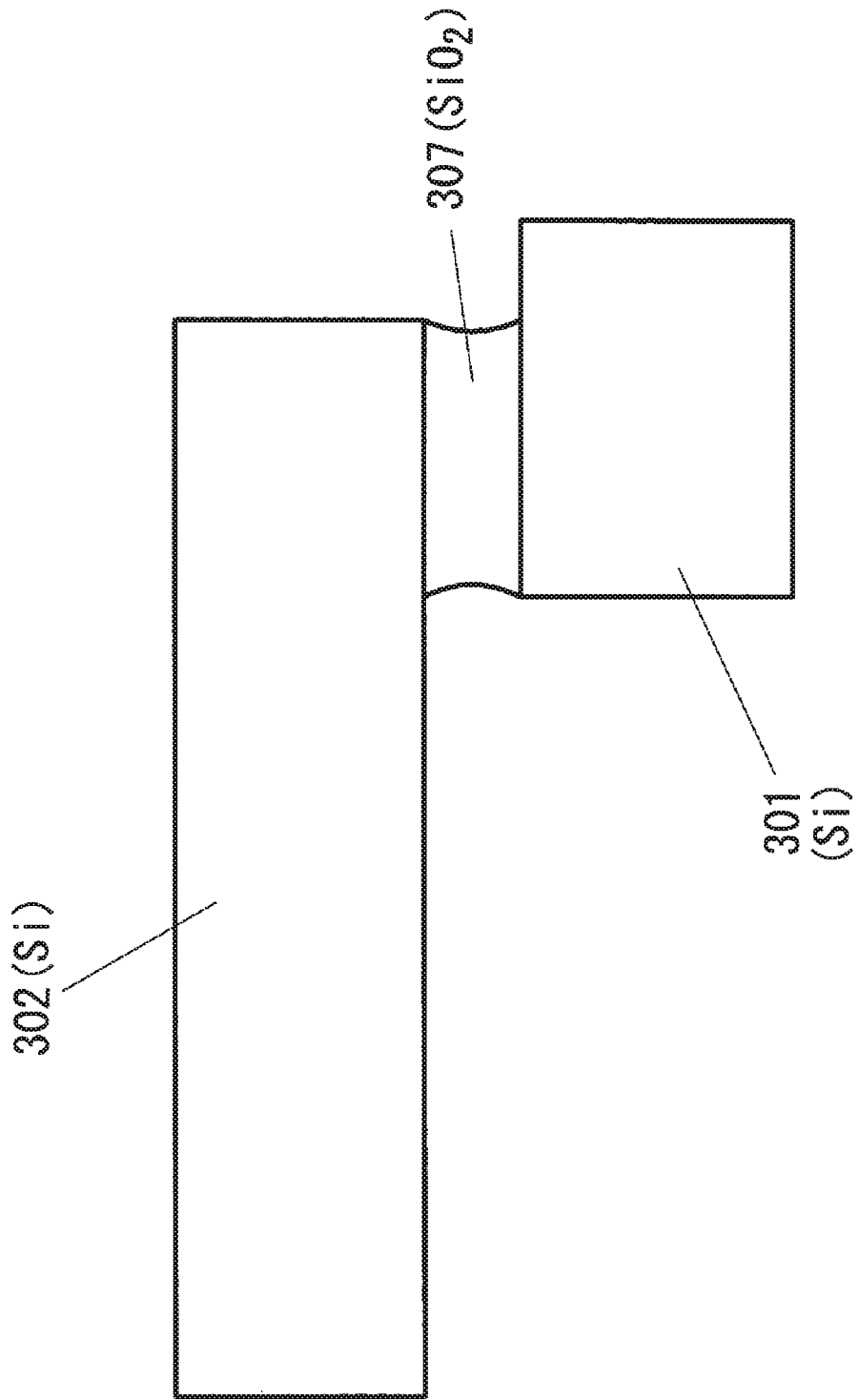
FIG. 9 is a sectional view taken along B1-B1 in FIG. 8.
Figure 10:
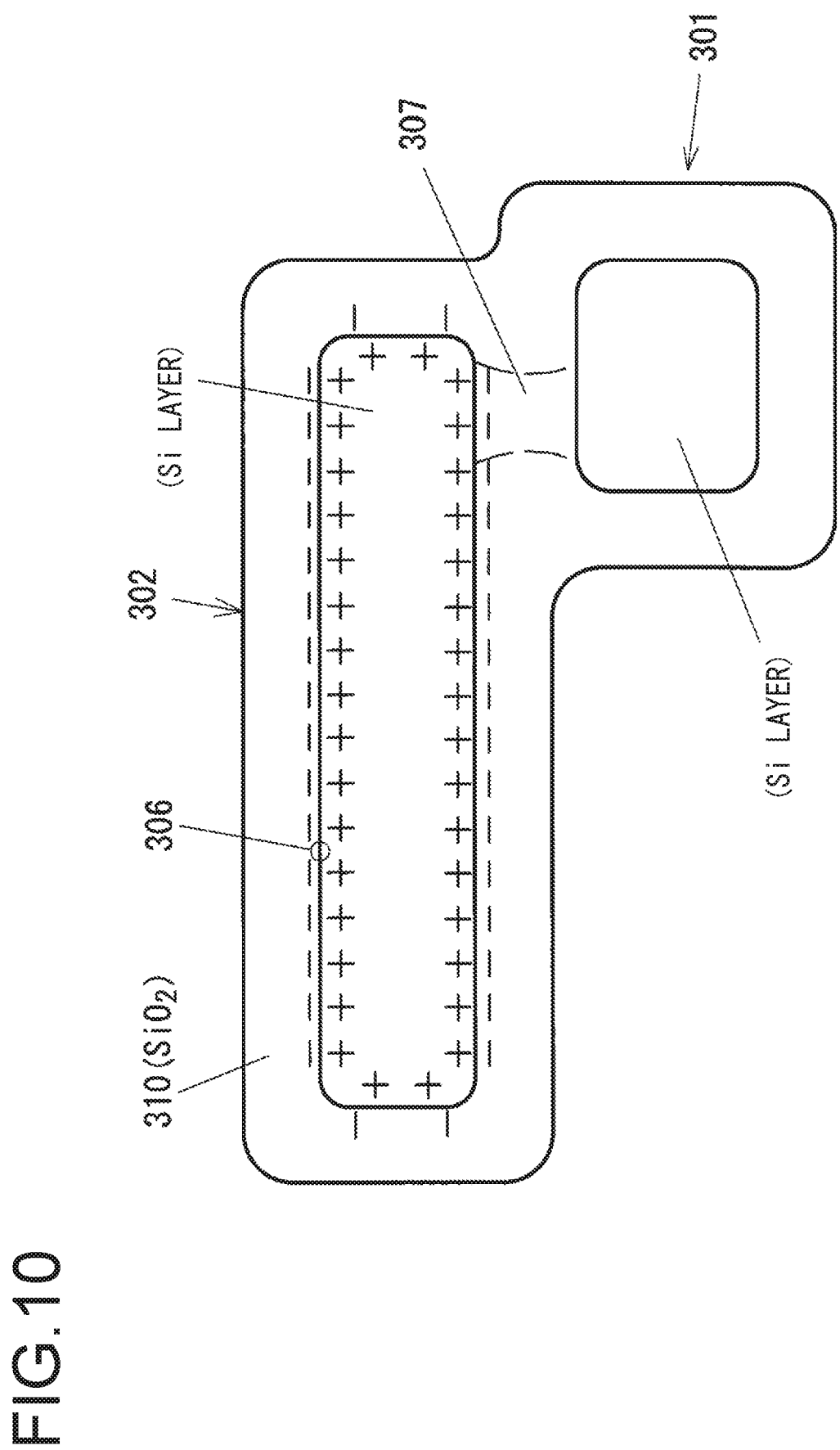
FIG. 10 is a sectional view taken along B1-B1 following oxide film formation and charge processing.

In the present embodiment, after the SOI substrate is machined into the shape shown in FIG. 9, an oxide film (SiO$_2$ layer), at which an electret is to be formed, is formed (with its thickness t set to approximately 0.2 to 1 μm) through thermal oxidation at the surface of the layer Si (see FIG. 10). Subsequently, an electret is formed as in the first embodiment by fixing an electric charge in the oxide film. It is to be noted that while the oxide film (SiO$_2$ layer) is formed at the surface of the Si layer through thermal oxidation in the present embodiment, it may be adopted in conjunction with an oxide film (SiO$_2$ layer) formed through any of various other oxide film-forming methods. For instance, it may be adopted in conjunction with an oxide film (SiO$_2$ layer) formed by depositing SiO$_2$ onto an Si layer through CVD.

FIG. 9 illustrates a phase prior to the oxide film formation in a sectional view taken along B1-B1 in FIG. 8. The pedestal 301 is formed with a handle layer (Si) at the SOI substrate. The fixed comb-tooth electrode 302 is formed with a device layer (Si) at the SOI substrate. The portion indicated with reference sign 307 is an embedded oxide film (SiO$_2$), which is referred to as a BOX layer in the SOI substrate. Although not shown, the movable comb-tooth electrode 303, the elastic support portion 305 and the weight 304 are formed with the device layer at the SOI substrate.

FIG. 10 presents a sectional view taken along B1-B1 following the oxide film formation and the subsequent charge processing. An oxide film 310 is formed at the surface of the fixed comb-tooth electrode 302, formed with an Si layer and also over the surface of the pedestal 301, formed with an Si layer. The charge processing for the oxide film 310 is executed as in the first embodiment by heating, with a heater or the like, the oxide film 310 constituting the SiO$_2$ layer until it reaches a temperature at which it is rendered into a semiconductor state. Once the oxide film 310 is rendered into the semiconductor state, it is cooled down to a temperature at which it regains its insulating property while applying a bias voltage V1 (10 to 200 V). As FIG. 10 indicates, the edges of the Si layer take on an R shape due to thermal oxidation, which lessens the extent of electric field concentration during the bias voltage application and thus increases the dielectric breakdown strength. For this reason, a relatively high bias voltage can be applied even though the gaps between the comb teeth of the fixed comb-tooth electrode 302 and the movable comb-tooth electrode 303 are small (approximately 2 μm).

(Detailed Description of the Charge Processing)

Figure 11:
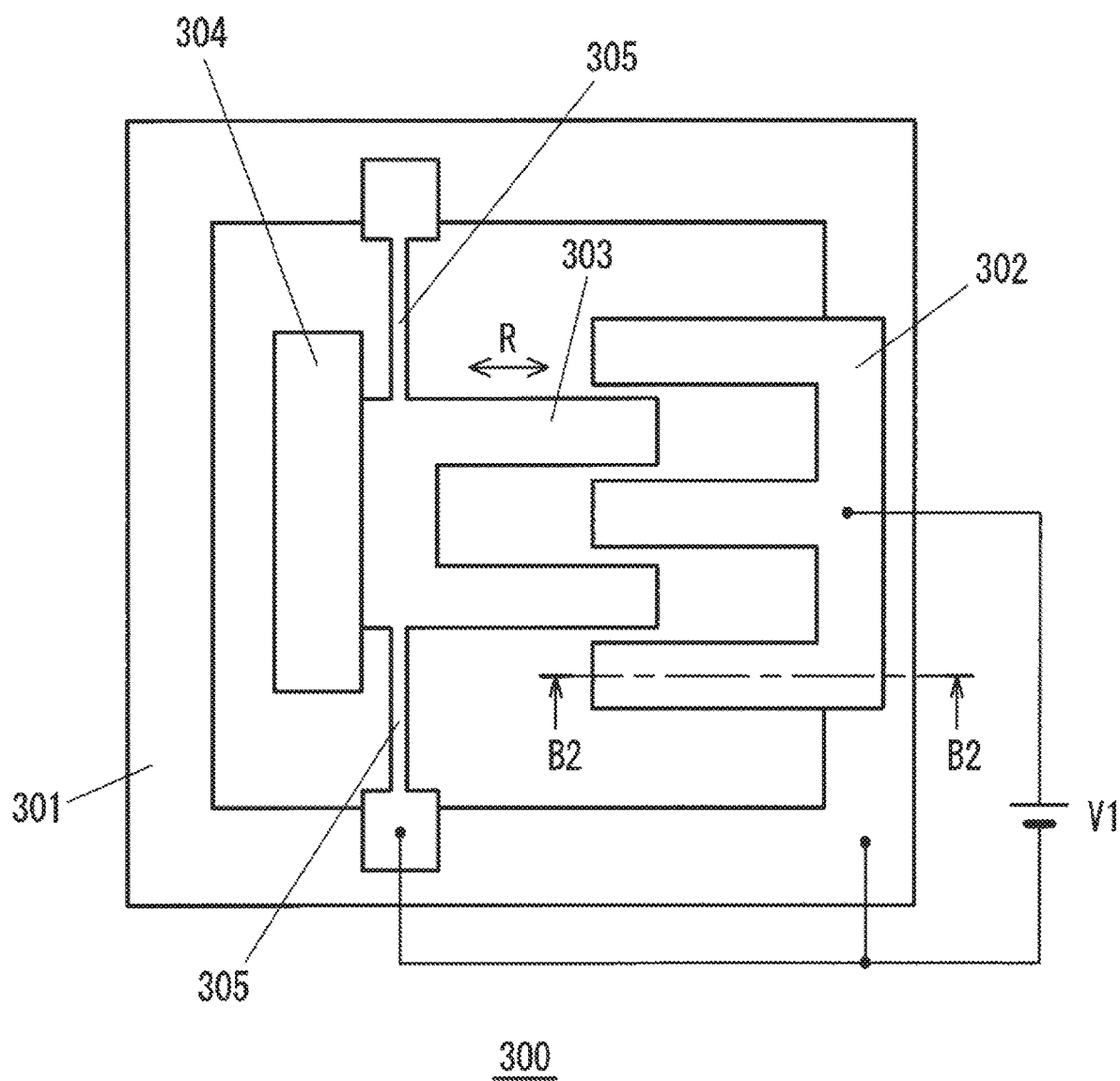
FIG. 11 is a diagram illustrating an application mode for application of a bias voltage V1.

For the charge processing, the bias voltage V1 is applied between the fixed comb-tooth electrode 302 and the movable comb-tooth electrode 303, and between the fixed comb-tooth electrode 302 and also the bias voltage V1 is applied the pedestal 301, as illustrated in FIG. 11. First, the vibration energy harvesting device 300 is heated until its temperature is raised to a level (500 to 700° C.) at which the oxide film 310 constituted of SiO$_2$ is rendered into a semiconductor state. Then, the bias voltage V1 is applied so as to form an electric double layer on the two sides of an Si/SiO$_2$ interface 306 at the fixed comb-tooth electrode 302.

Figure 12:
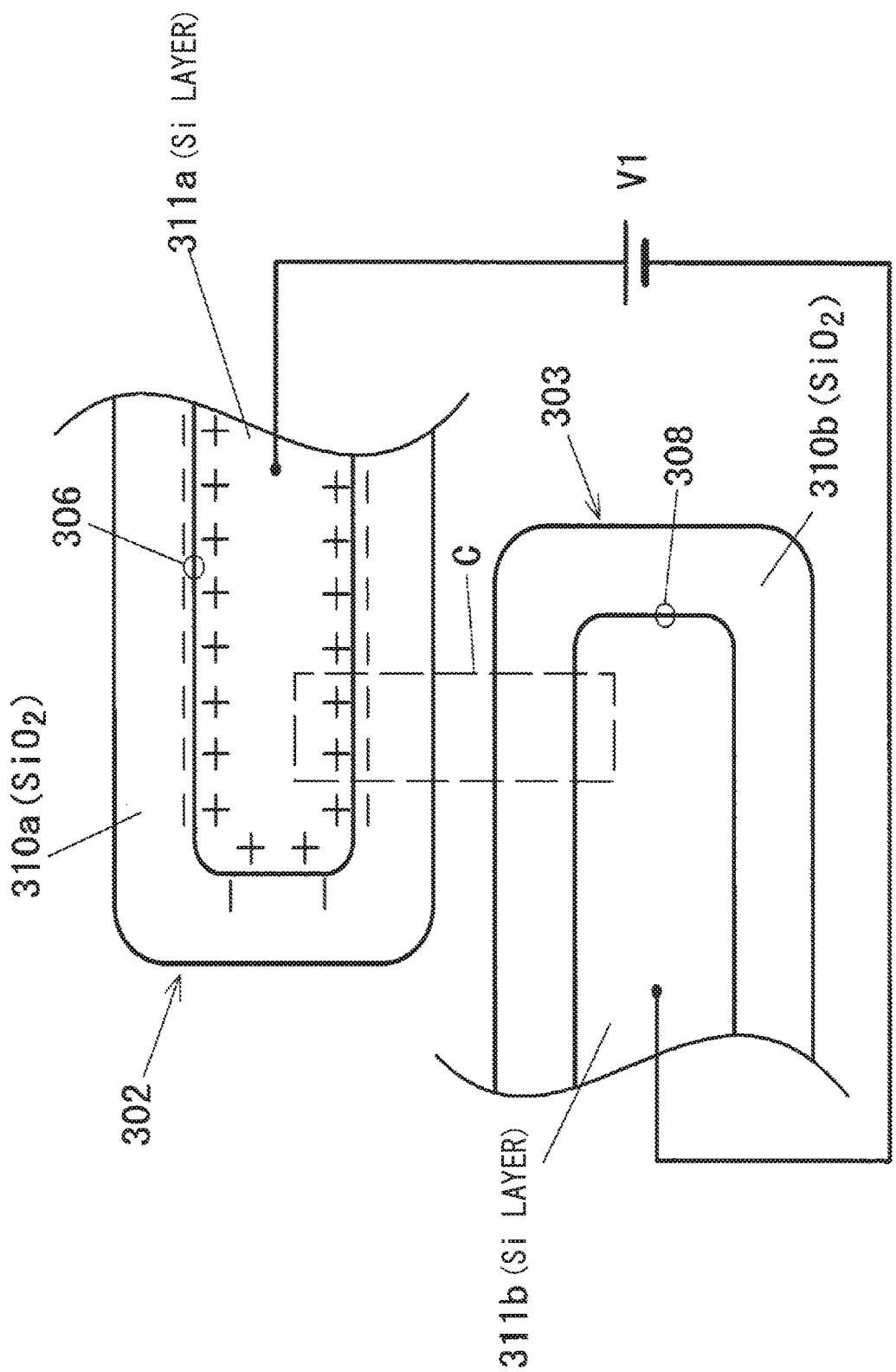
FIG. 12 is a schematic diagram illustrating in detail an electric double layer formed at a comb-tooth electrode.

FIG. 12 is a schematic sectional view (a section ranging parallel to the drawing sheet on which FIG. 11 is presented) of a region where the fixed comb-tooth electrode 302 with the electric double layer formed thereat and the movable comb-tooth electrode 303 overlap each other. It is to be noted that in the following description, the oxide film formed at the fixed comb-tooth electrode 302 will be denoted with reference sign 310*a* and the oxide film formed at the movable comb-tooth electrode 303 will be denoted with reference sign 310*b*. In addition, the Si layer of the fixed comb-tooth electrode 302 will be denoted with reference sign 311*a* and the Si layer at the movable comb-tooth electrode 303 will be denoted with reference sign 311*b*. As the bias voltage is applied, the potential difference at the electric double layer formed at the Si/SiO$_2$ interface 306 gradually increases until it eventually becomes equal to the voltage V1 (within several seconds to several minutes).

Since the electric resistivity at the SiO$_2$ layer (the oxide film 310*a* and the BOX layer 307) being rendered into the semiconductor state is lowered, a substantially uniform potential is created within the SiO$_2$ layer. Thus, a uniform charge density is achieved through the entire Si/SiO$_2$ interface 306, allowing the electric double layer to be formed through the tips of the comb teeth. It is to be noted that when the electric double layer is formed through the entire Si/SiO$_2$ interface 306, the SiO$_2$ layer with the lower resistivity provides an electrostatic seal and thus, the electric field is not allowed to extend beyond the electric double layer. Since no electrostatic force is at work between the comb-tooth electrodes in this state, a decision as to whether or not the charge processing has been completed can be made by measuring the level of the electrostatic force between the comb-tooth electrodes.

Figure 13:
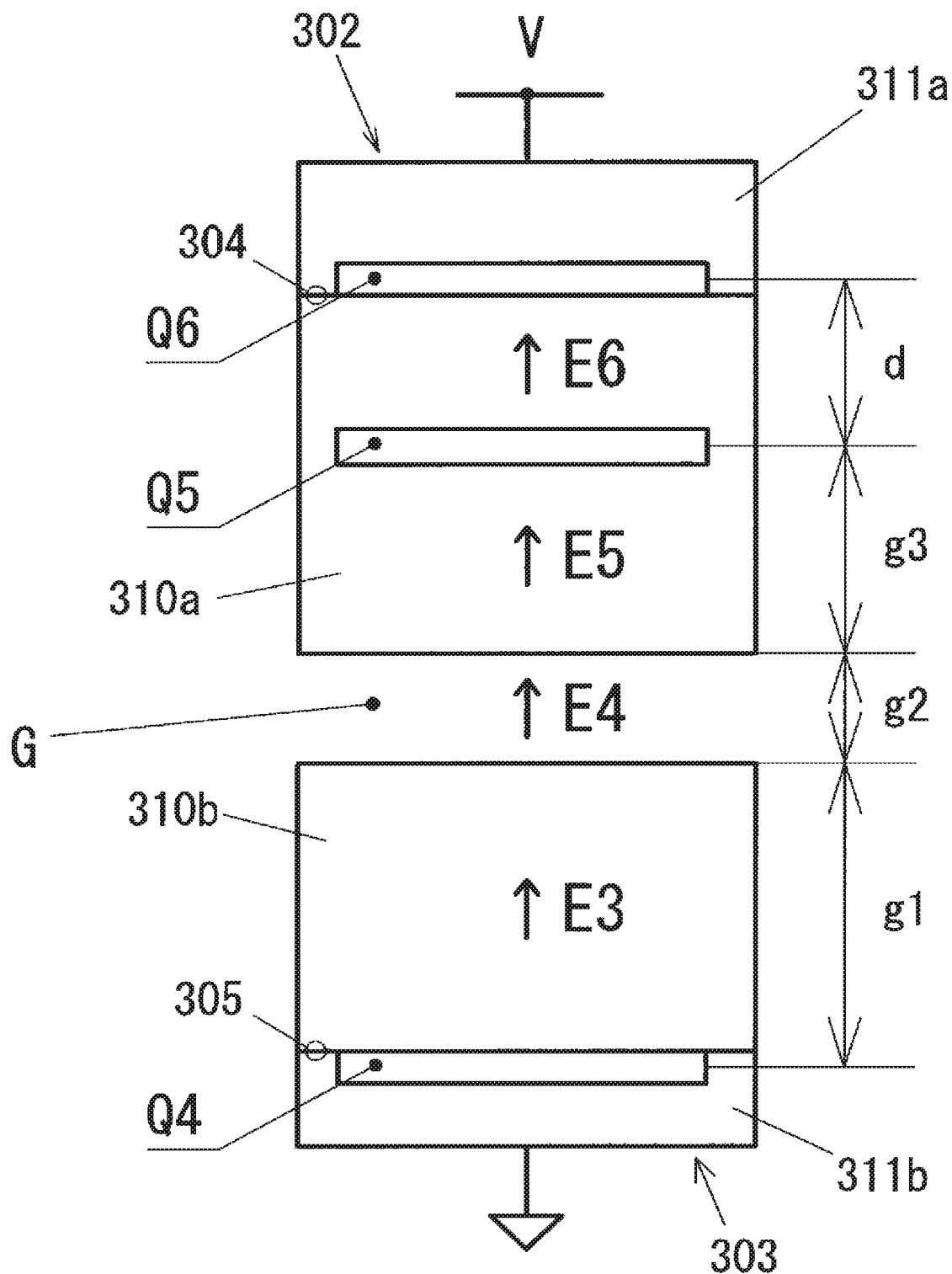
FIG. 13 is a schematic diagram illustrating in detail the structure of the region enclosed by the dotted line C in FIG. 12.

FIG. 13 is a schematic diagram corresponding to FIG. 5 pertaining to the first embodiment, illustrating in detail the structure assumed in the region enclosed by the dotted line C in FIG. 12. Surface charges Q5 and Q6, constituting the electric double layer on the two sides of the Si/SiO$_2$ interface 306, are formed respectively in the oxide film 310*a* and in the Si layer 311*a* at the fixed comb-tooth electrode 302. A surface charge Q4 is an electric charge accumulated in the Si layer 311*b* at the movable comb-tooth electrode 303. E3 is an electric field formed within the oxide film 310*b* at the movable comb-tooth electrode 303. E5 and E6 are electric fields formed within the oxide film 310*a* at the fixed comb-tooth electrode 302. E4 is an electric field formed in a gap space G between the comb-tooth electrodes 302 and 303.

The following equations (13) through (17) can be written by adopting Gauss's Law individually for the region where the surface charge Q4 is present, the region that includes the interface of the oxide film 310*b* and the gap space G, the region that includes the interface of the oxide film 310*a* and the gap space G, the region where the surface charge Q5 is present and the region where the surface charge Q6 is present, as illustrated in FIG. 13. It is to be noted that S represents the area of a section of a region C in FIG. 12. ε0 and ε1 respectively represent the dielectric constant in the gap space G and the dielectric constant in the oxide film (SiO$_2$).

$$\varepsilon 1 \cdot E3 \cdot S = Q4 \quad (13)$$

$$(\varepsilon 0 \cdot E4 \cdot \varepsilon 1 \cdot E3) \cdot S = 0 \quad (14)$$

$$(\varepsilon 1 \cdot E5 - \varepsilon 0 \cdot E4) \cdot S = 0 \quad (15)$$

$$(\varepsilon 1 \cdot E6 - \varepsilon 1 \cdot E5) \cdot S = Q5 \quad (16)$$

$$-\varepsilon 1 \cdot E6 \cdot S = Q6 \quad (17)$$

In addition, since the potential difference between the upper Si layer 311a and the lower Si layer 311b is V, the relationship expressed in the following equation (18) is true with respect to distances d, g1, g2 and g3 in FIG. 13.

$$g1 \cdot E3 + g2 \cdot E4 + g3 \cdot E5 + d \cdot E6 = -V \quad (18)$$

Based upon equations (13) through (17), the relationship among the surface charges Q4, Q5 and Q6 can be expressed as in equation (19) below.

$$Q6 = -Q5 - Q4 \quad (19)$$

In addition, based upon equations (13) through (18), the surface charge Q5, i.e., an electret charge, can be expressed as in equation (20)

$$Q5 = -[(d + g1 + g2(\varepsilon 1/\varepsilon 0) + g3)/d]Q4 - \varepsilon 1 \cdot S \cdot V/d \quad (20)$$

Figure 14:
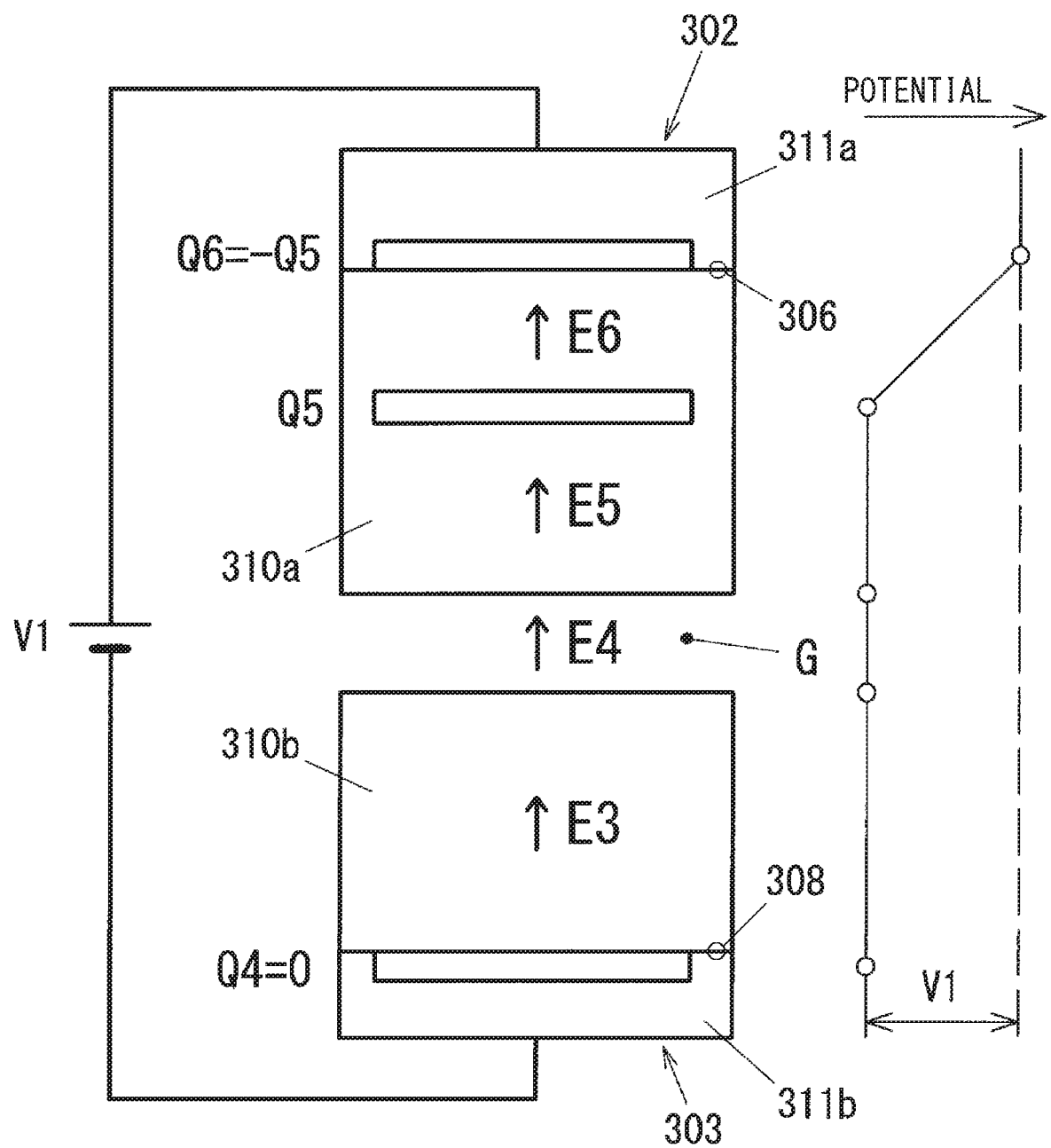
FIG. 14 is an illustration of a state manifesting when the voltage being applied is V1.

When the bias voltage V1 is applied as illustrated in FIG. 14, electric current flows through an Si/SiO$_2$ interface 308 and thus, V=V1 and Q4=0 are true while the bias voltage application is underway. Assuming that V and Q4 in equation (20) are equal to V1 and 0 respectively, the surface charge Q5 can be expressed as in equation (21) below. If the applied voltage V1 is greater than 0, Q5<0 is true. In addition, if Q4 in equation (19) is equal to 0, Q6=−Q5 is true. Namely, an electric double layer is formed at the Si/SiO$_2$ interface 306 and the voltage V1 concentrates in the electric double layer in the example presented in FIG. 14.

$$Q5 = -\varepsilon 1 \cdot S \cdot V1/d \quad (21)$$

Figure 15:
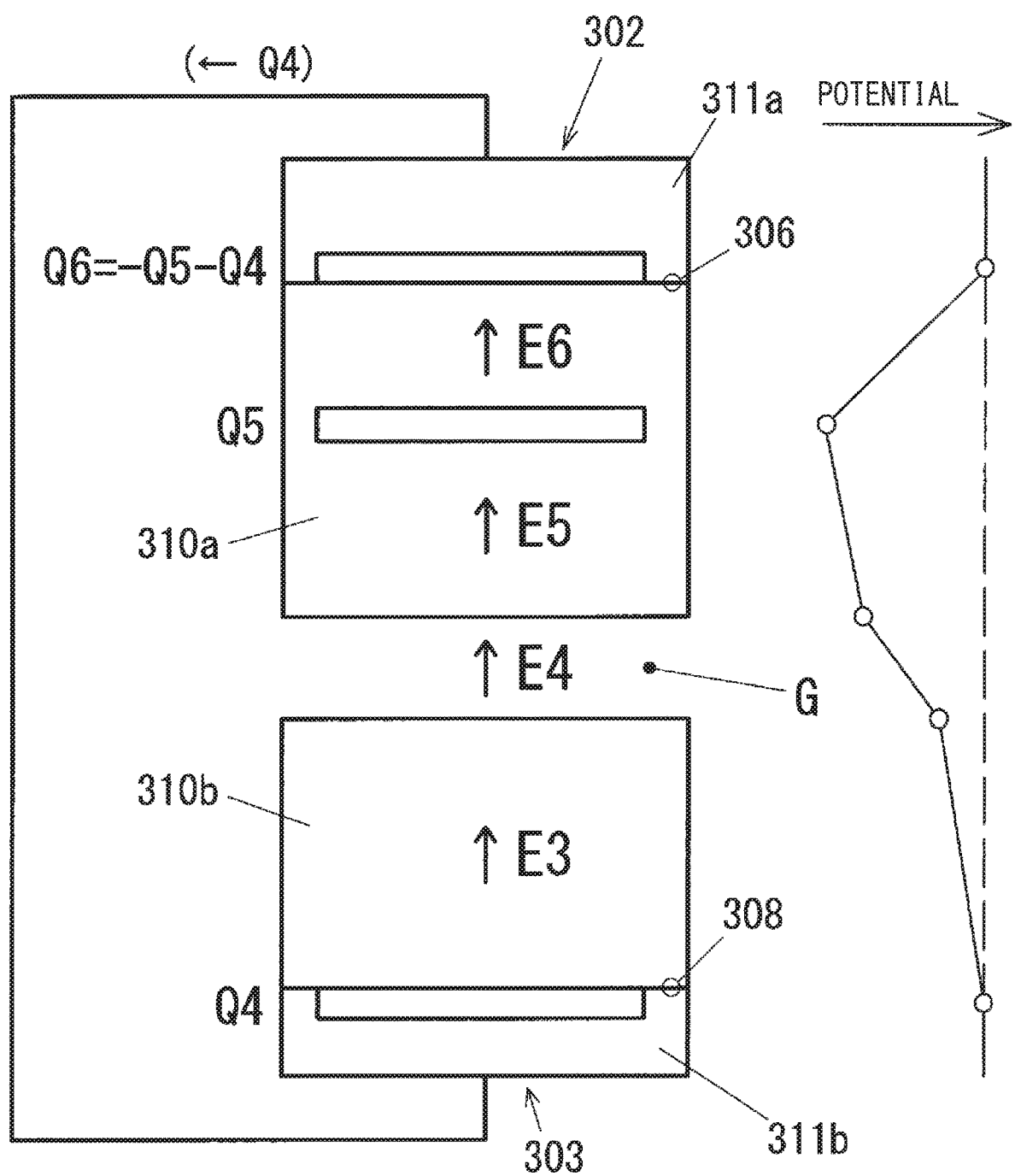
FIG. 15 is an illustration of a state manifesting when no voltage is being applied.

As the temperature is lowered to a level (e.g., room temperature) at which SiO$_2$ regains its insulating property in the state shown in FIG. 14, in which the electric double layer is formed at the Si/SiO$_2$ interface 306, i.e., while the bias voltage V1 is being applied, the surface charge Q5 accumulated in the oxide film 310a becomes fixed at the position indicated in FIG. 14. Subsequently, as the Si layer 311a in the fixed comb-tooth electrode 302 and the Si layer 311b in the movable comb-tooth electrode 303 are connected as shown in FIG. 15, the charge (Q4) is caused to move from the Si layer 311a to the Si layer 311b due to the potential difference (see FIG. 14) between these Si layers, resulting in a decrease in the potential difference. The extent to which the charge moves when the potential difference changes from V1 to V is expressed as in equation (22) below. Ultimately, the value of the surface charge Q4 when there is no longer any potential difference, as shown in FIG. 15, can be calculated as in equation (23) below.

$$Q4 = -\varepsilon 0 \cdot S \cdot (V1 - V)/[g' + d \cdot (\varepsilon 0/\varepsilon 1)] \quad (22)$$

when $g' = g2 + (g1 + g3) \cdot (\varepsilon 0/\varepsilon 1)$ $$Q4 = \varepsilon 0 \cdot S \cdot V1/[g' + d \cdot (\varepsilon 0/\varepsilon 1)] \quad (23)$$

An equation Q4=ε0·E4·S can be written based upon equations (13) and (14). By incorporating this equation and equation (23), the electric field E4 in the gap space G in FIG. 15 can be expressed as in equation (24) below. This electric field matches an electric field formed by applying the voltage V1 in a structure without an electret (surface charge Q5).

$$E4 = -V1/[g' + d \cdot (\varepsilon 0/\varepsilon 1)] \quad (24)$$

(Description of the Power Generating Operation)

Figure 16A:
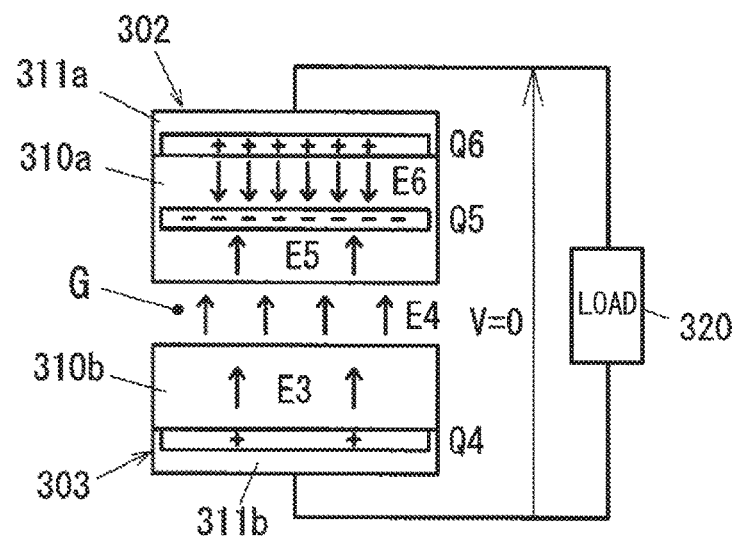
FIGS. 16A-16C show illustrations of the power generating operation executed in a vibration energy harvesting device.
Figure 16B:
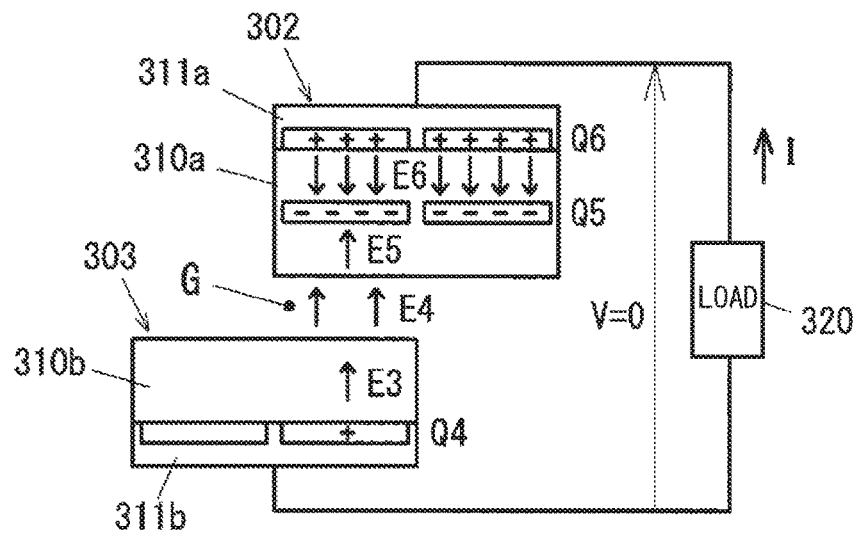
Figure 16C:
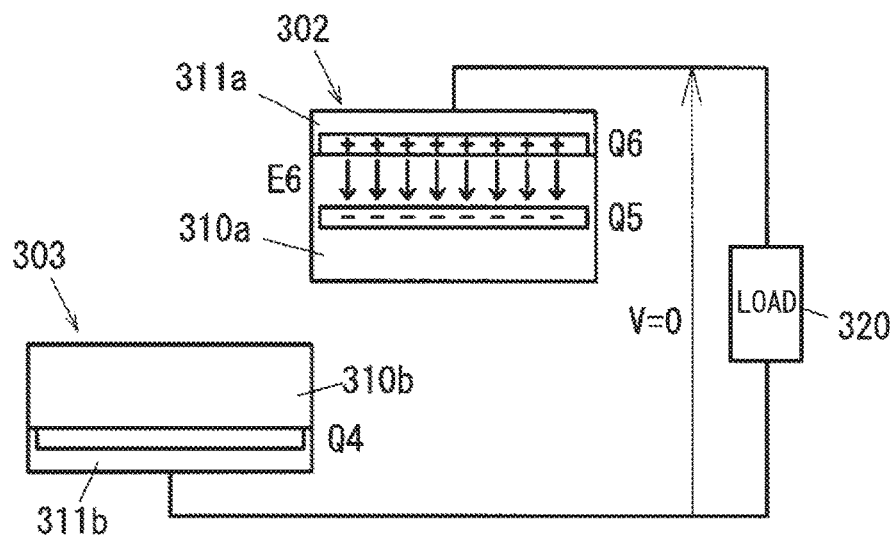

Next, the power generating operation executed in the vibration energy harvesting device 300 will be described. FIG. 16 schematically illustrates a state (c) achieved as the movable comb-tooth electrode 303 slides away from the fixed comb-tooth electrode 302 until their comb teeth do not overlap at all, a state (b) in which their comb teeth are half overlapped and a state (a) in which the comb teeth entirely overlap. This operational rationale may be conceptualized in conjunction with a load 320 having an impedance set at the lower limit connected therein, which corresponds to a condition in which the charge quantity of the surface charge Q4 changes as the area S (equivalent to the overlap area) changes in the equation (22). It is to be noted that the following description on how the charge quantity changes will be given by assuming that each negative sign in the surface charge Q5 represents a charge quantity −q and each positive sign in the surface charges Q4 and Q6 represents a charge quantity +q for purposes of simplification.

In the state (a) in FIG. 16, which is similar to the state shown in FIG. 15, the potential in the Si layer 311a at the fixed comb-tooth electrode 302 and the potential in the Si layer 311b at the movable comb-tooth electrode 303 are equal to each other. Namely, the potential difference V is equal to 0. This means that no electric current flows through the load 320. In this state, the surface charge Q6 achieves a charge quantity +6q, the surface charge Q5 achieves a charge quantity −8q and the surface charge Q4 achieves a charge quantity +2q.

In the state (b), the movable comb-tooth electrode 303 has moved to the left in the figure relative to the fixed comb-tooth electrode 302, resulting in the comb teeth overlap area being reduced by half. As the overlap area decreases, the charge quantity of the surface charge Q4 decreases from +2q to +q and the charge quantity of the surface charge Q6 increases from +6q to +7q. Consequently, an electric current I flow from the Si layer 311b at the movable comb-tooth electrode 303 to the Si layer 311a at the fixed comb-tooth electrode 302.

As the overlap area further decreases relative to the state (b), the charge quantity of the surface charge Q4 also decreases. Then, when the overlap area becomes 0 in the state (c), the charge quantity of the surface charge Q4 also becomes 0 whereas the surface charge Q6 achieves a charge quantity +8q.

To summarize, as the movable comb-tooth electrode 303 vibrates relative to the fixed comb-tooth electrode 302, the conditions shift through the states (a) through (c) in FIG. 16 repeatedly so that (a)→(b)→(c)→(b)→(a)→(b) . . . , resulting in an AC current flowing through the load 320. It is to be noted that when a load having an impedance at the higher limit is connected as the load 320, the overlap area changes without altering the charge quantity of the surface charge Q4 and, as a result, a change occurs in the potential difference V. Generally speaking, the electric power to be extracted can be maximized by adjusting the load impedance.

Third Embodiment

Figure 17:
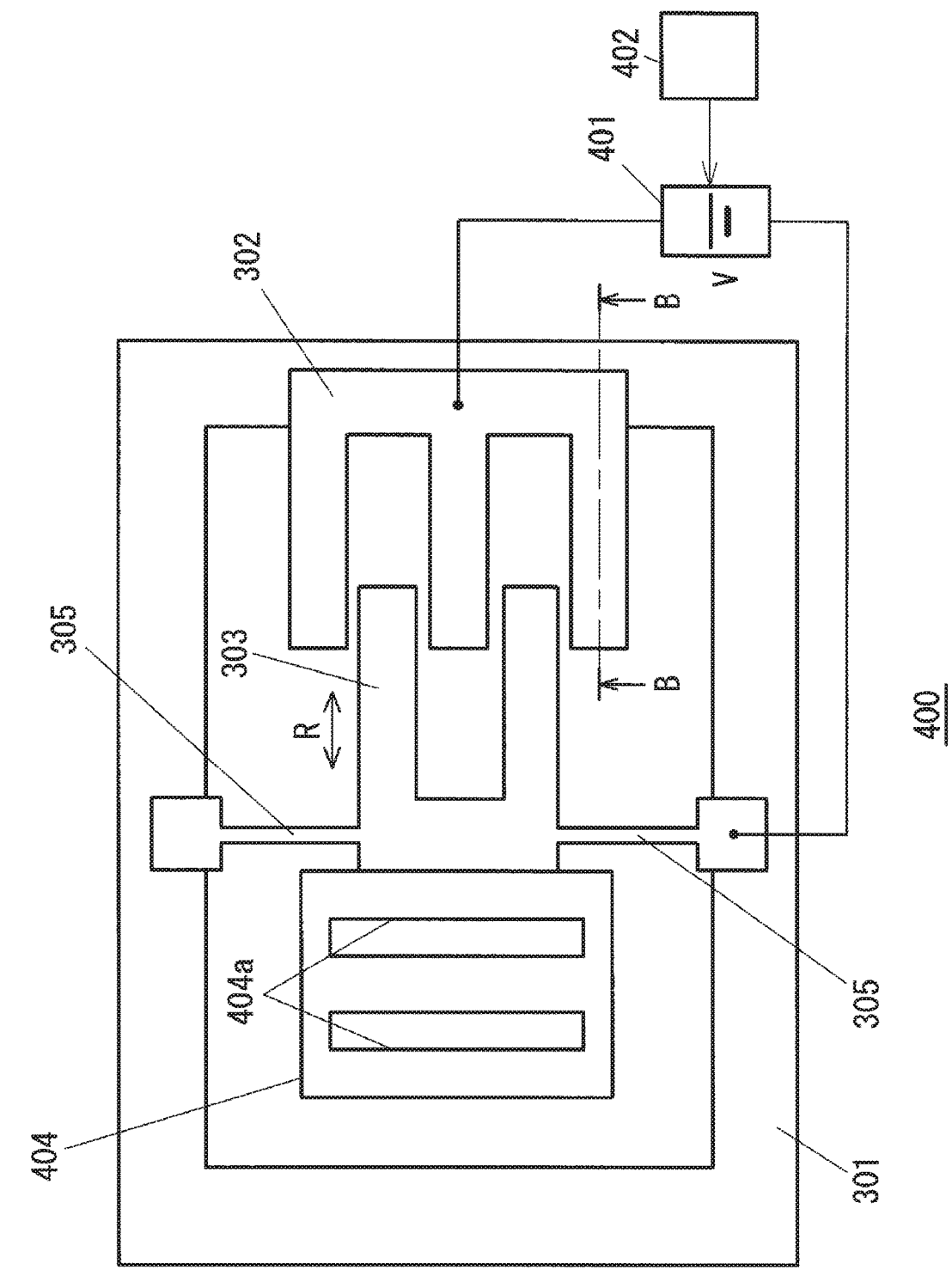
FIG. 17 is a schematic illustration of the structure of an MEMS shutter.

The third embodiment is achieved by adopting the electret element according to the first embodiment in a comb-tooth actuator in an MEMS shutter. FIG. 17 schematically illustrates the structure of an MEMS shutter 400 according to the embodiment. It is to be noted that the same reference signs are assigned to structural elements similar to those in the vibration energy harvesting device 300 shown in FIG. 8. Namely, the MEMS shutter 400 is formed by processing an SOI substrate and includes a fixed comb-tooth electrode 302 secured at a pedestal 301 taking the shape of a rectangular ring and a movable comb-tooth electrode 303 secured at the pedestal 301 via an elastic support portion 305. The fixed comb-tooth electrode 302 and the movable comb-tooth electrode 303 configure a comb-tooth actuator. The shutter unit 404 with an opening 404a formed thereat is disposed at the movable comb-tooth electrode 303.

From a voltage source 401, a voltage to be used for actuator drive is applied between the fixed comb-tooth electrode 302 and the movable comb-tooth electrode 303. A control unit 402 causes the movable comb-tooth electrode 303 with the shutter unit 404 disposed thereat to move along a direction indicated by the arrow R by controlling the voltage V applied from the voltage source 401. The shutter unit 404 is positioned on an optical path, and as the movable comb-tooth electrode 303 moves and the opening 404a at the shutter unit 404 is set in the optical path, a light beam passes through the shutter unit 404. When the non-open region (shielding region) of the shutter unit 404 is set in the optical path, the light beam is blocked by the shutter unit 404.

It is to be noted that since the fixed comb-tooth electrode 302 and the movable comb-tooth electrode 303 assume structures similar to those described in reference to the second embodiment, are formed through methods similar to those described earlier in reference to the second embodiment and an electret is formed at the fixed comb-tooth electrode 302 through a method similar to that described in reference to the second embodiment, a repeated explanation is not provided.

(Description of the Operation)

Figure 18B:
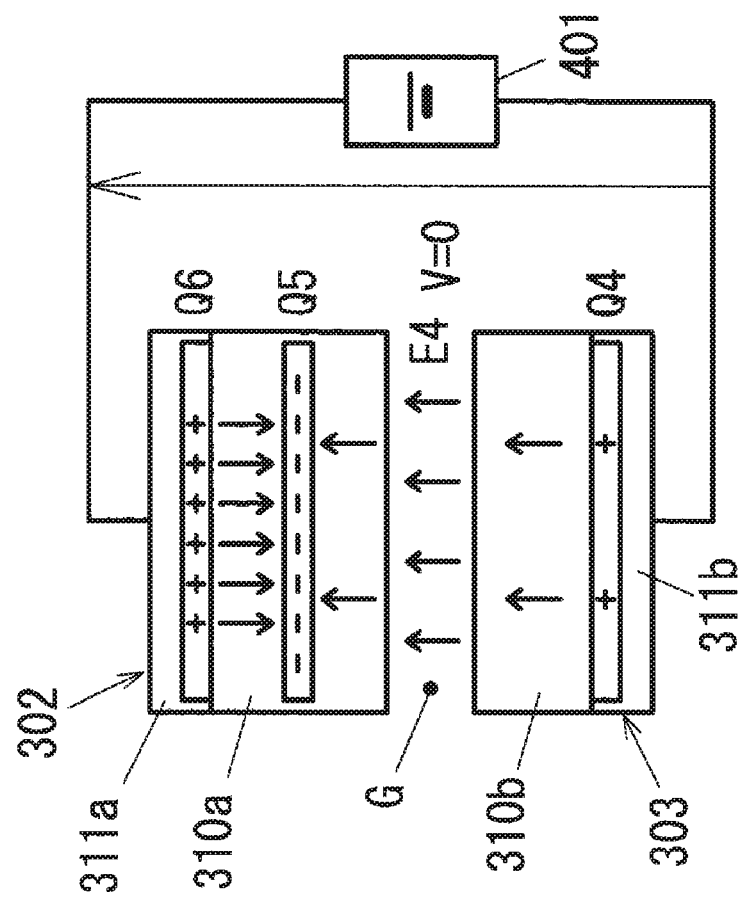
FIGS. 18A and 18B show illustrations of the drive operation of a comb-tooth actuator executed when the voltage V being applied is V=0.
Figure 18A:
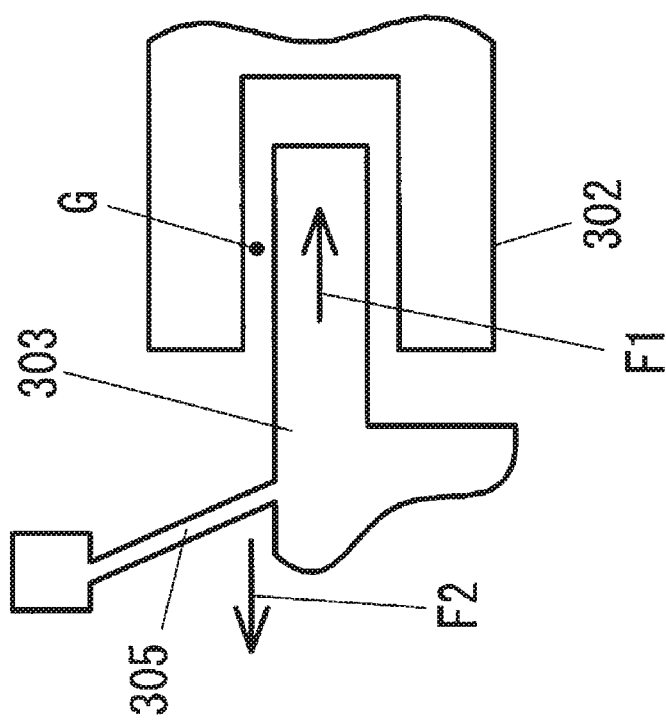
Figure 19B:
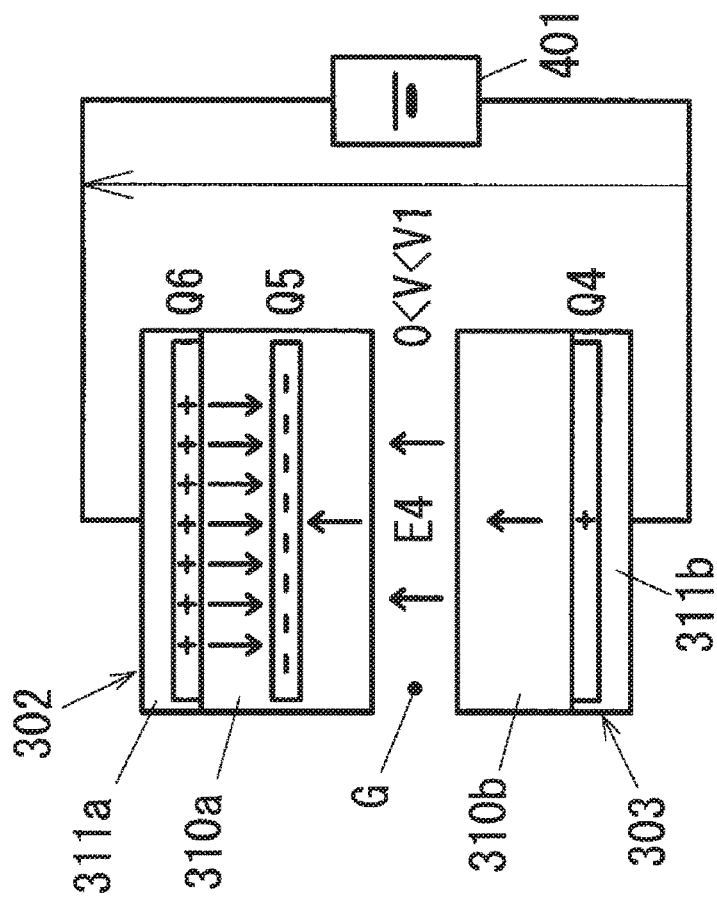
FIGS. 19A and 19B show illustrations of the drive operation of the comb-tooth actuator executed when the applied voltage V is set so that 0<V<V1.
Figure 19A:
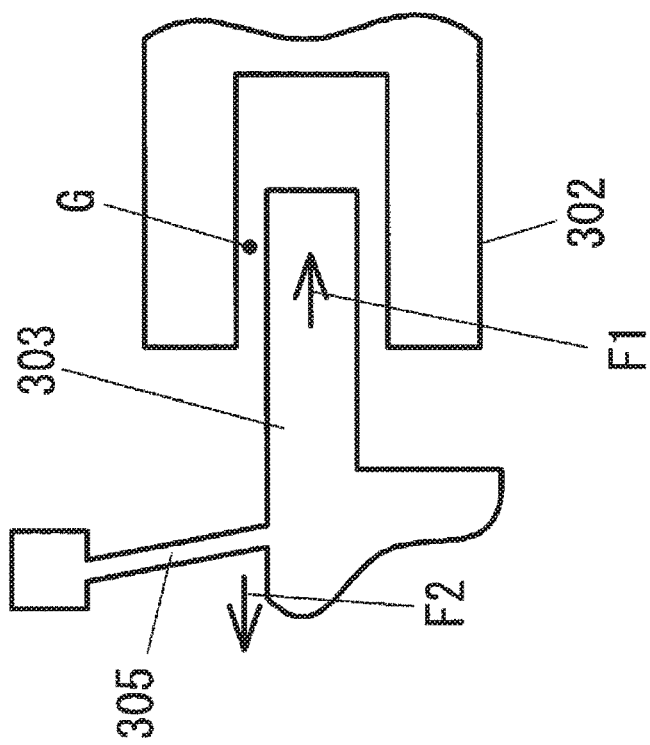
Figure 20B:
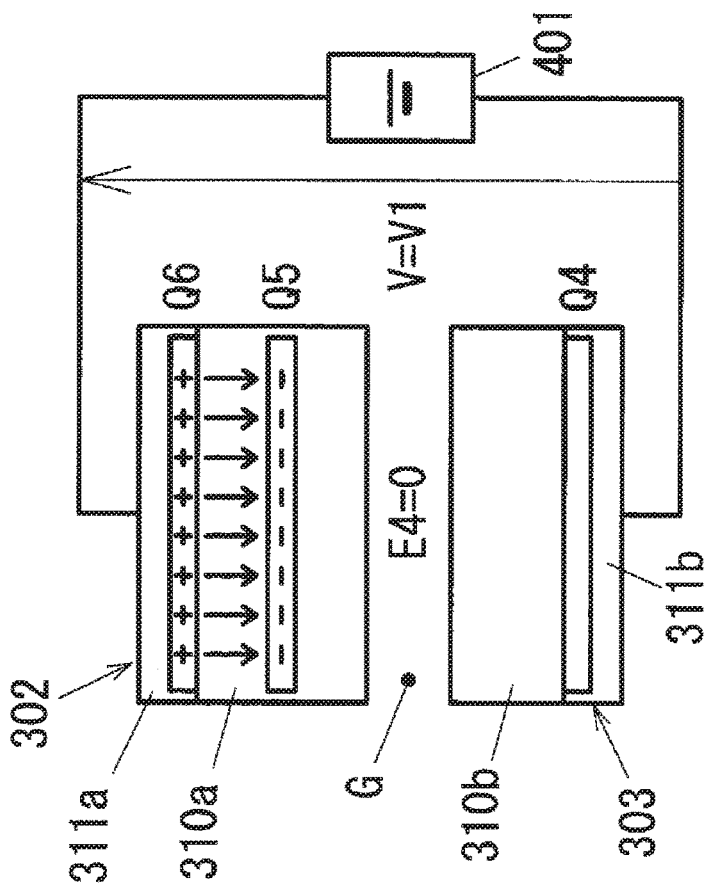
FIGS. 20A and 20B show illustrations of the drive operation of the comb-tooth actuator executed when the voltage V being applied is V=V1.
Figure 20A:
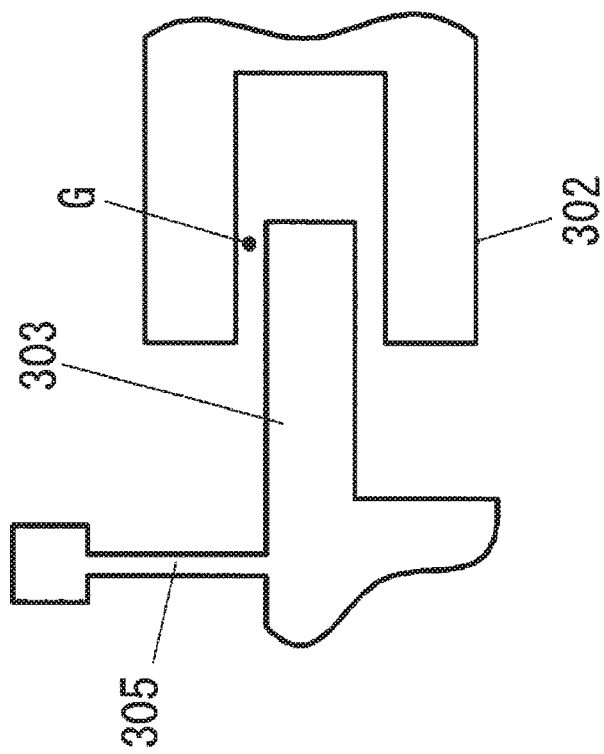

FIGS. 18 through 20 illustrate how the comb-tooth actuator is engaged in drive operation. FIG. 18 illustrates a state in which the voltage V applied from the voltage source 401 is 0. In FIG. 18, (a) shows forces F1 and F2 act to the movable comb-tooth electrode 303 and (b) indicates the relationship between the applied voltage V and an electric field E4. When the applied voltage V is 0, the potential at the Si layer 311a and the potential at the Si layer 311b are equal to each other and thus, a state identical to that shown in FIG. 15 and FIG. 16 is achieved. The electric field E4, which can be calculated as expressed in equation (24) explained earlier, is formed in the gap space G between the fixed comb-tooth electrode 302 and the movable comb-tooth electrode 303. Via this electric field E4, the force F1, working along the rightward direction in the figure, is applied to the movable comb-tooth electrode 303 so as to draw its comb teeth further into the gaps between the comb teeth in the fixed comb-tooth electrode 302.

As the force F1 attributable to the electric field E4 causes the movable comb-tooth electrode 303 to move so as to draw its comb-teeth into the fixed comb-tooth electrode 302, the elastic support portion 305 alters its shape, as illustrated in FIG. 18(a). As a result, a force F2, attributable to the elastic force imparted by the elastic support portion 305, is applied to the movable comb-tooth electrode 303 so as to draw it back to the left in the figure. The movable comb-tooth electrode 303 comes to a stop at a position at which the force F1 and the force F2 are in balance.

FIG. 19 illustrates a state in which the applied voltage V is set so that 0<V<V1. The value representing the electric field E4 in the gap space G in this state can be expressed as in equation (25) below, which can be obtained by adopting equations (13) and (14) in equation (22) explained earlier. As equations (24) and (25) indicate, the intensity of the electric field E4 in FIG. 19 is lower than that achieved when the applied voltage V is 0. Thus, the electrostatic force F1 drawing the movable comb-tooth electrode 303 toward the fixed comb-tooth electrode 302 decreases, allowing the movable comb-tooth electrode 303 to move to the left until it reaches the position at which the electrostatic force F1 is in balance with the elastic force F2 imparted from the elastic support portion 305, as indicated in FIG. 19(a).

$$E4 = -(V1-V)/[g'+d \cdot (\varepsilon 0/\varepsilon 1)] \quad (25)$$

FIG. 20 illustrates a state in which the applied voltage V is set to V1. In this situation, the charge quantity of the surface charge Q5 and the charge quantity of the surface charge Q6 are equal to each other and the potential difference equal to V1 manifests at the electric double layer formed with those charges. As a result, no electric field E4 is generated in the gap space G and accordingly, no electrostatic force F1 is in effect between the fixed comb-tooth electrode 302 and the movable comb-tooth electrode 303. This means that no deformation occurs at the elastic support portion 305, as illustrated in FIG. 20.

In the embodiment described above, a shutter can be opened/closed via the shutter unit 404 by altering the voltage V applied from the voltage source 401 so as to drive the movable comb-tooth electrode 303 in a sliding motion. In addition, the presence of an electret fitted in a comb-tooth electrode, as shown in FIGS. 18 through 20, makes it possible to achieve the highest level of intensity for the electric field E4 in the gap space G when the applied voltage V is 0.

Figure 21:
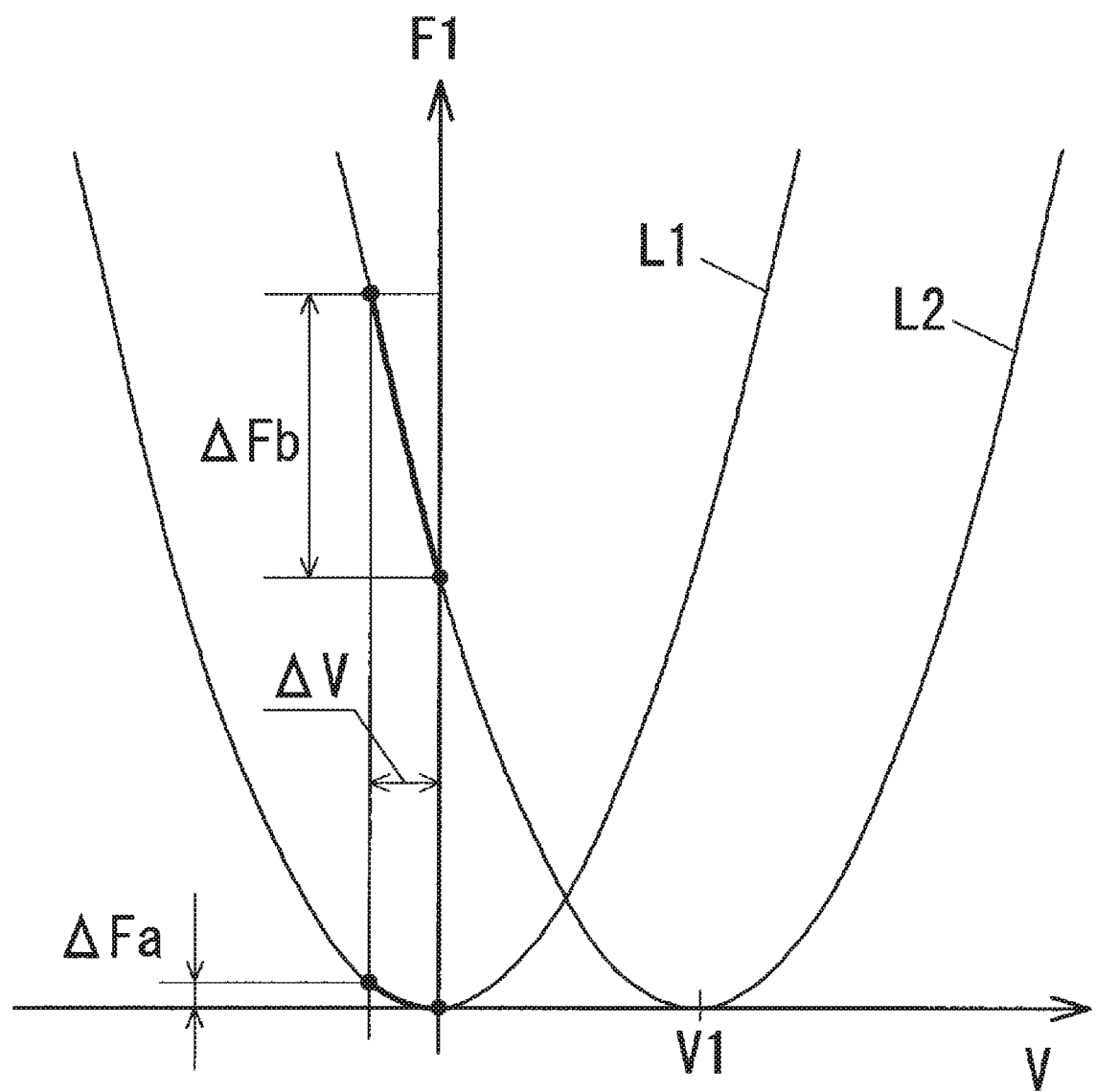
FIG. 21 is a diagram indicating effects of the electret.

The electrostatic force in action between the comb teeth in a comb-tooth actuator is in proportion to the square of the electric field. Accordingly, the relationship between the applied voltage V and the electrostatic force F1 achieved in a structure in which the comb-tooth actuator is driven entirely with the applied voltage V without using an electret is represented by a quadratic curve such as a line L1 in FIG. 21. The relationship between the applied voltage V and the electrostatic force F1 achieved in a comb-tooth actuator having an electret formed therein as in the embodiment, on the other hand, may be represented by, for instance, a line L2. The line L2 is offset relative to the line L1 toward the positive side along the horizontal axis by an extent corresponding to the charging voltage V1 at the electret. As a result, an electrostatic force $\Delta Fb$ at the comb-tooth actuator with the electret with a given voltage $\Delta V$ applied thereto is greater than an electrostatic force $\Delta Fa$ generated at the comb-tooth actuator without an electret with the same voltage $\Delta V$ applied thereto. Namely, a greater electrostatic force can be achieved in conjunction with an electret in comparison to that achieved in a structure engaged in operation entirely on an external bias voltage.

As described above, an electret element includes the Si layer 202, the $SiO_2$ layer 201 formed at the surface of the Si layer 202 and the electret (surface charge Q2) formed at the Si layer 201 near the interface of the $SiO_2$ layer 201 and the Si layer 202, as illustrated in FIGS. 4 and 7. Since the surface charge Q2 constituting the electret is fixed near the $Si/SiO_2$ interface, the $SiO_2$ layer 201 functions as a protective film, making it possible to improve the service life of the electret.

The electret is formed by applying a voltage between the Si layer 202 and the $SiO_2$ layer 201 while sustaining the Si layer 202 with the SiO2 layer 201 formed thereat at a first temperature (approximately 500 to 700° C.) at which the $SiO_2$ layer 201 is rendered in a semiconductor state and then by altering the temperature of the Si layer 202 with the $SiO_2$ layer 201 formed thereat from the first temperature to a second temperature (e.g., approximately 300° C. or lower)

as which the SiO₂ layer 201 regains its insulating property while applying the voltage continuously.

Through this electret-forming method in which an electric charge is caused to move and be fixed within an SiO₂ layer, an electret can be formed with ease even in a narrow gap region such as along the side surfaces of the comb teeth of a comb-tooth electrode, as shown in FIG. 8, or at an electrode located in a sealed space. Since an electret can be formed with ease over a narrow gap region, the dimensions of the gaps can be further reduced, which, in turn, makes it possible to improve the performance of a power generation device or an actuator.

In addition, since an electric charge is allowed to move irrespective of the electric field at the device surface, a charge can be achieved with uniform charge density through the charge processing (electret formation processing) without having to take any special measures. Furthermore, since the charge is achieved by forming an electric double layer, as shown in FIG. 3, a high charge density can be assured even when the gap between the electric charges accumulated on the two sides of the interface is very small and the potential is low.

In addition, as the second embodiment includes the fixed comb-tooth electrode 302 and the movable comb-tooth electrode 303 disposed so as to face opposite each other with the fixed comb-tooth electrode 302 constituted with an electret element. The device structured as in the second embodiment is able to function as the electromechanical converter (e.g., the vibration energy harvesting device 300) capable of converting electric energy to mechanical energy and vice versa, as the movable comb-tooth electrode 303 moves, i.e. as the movable comb-tooth electrode 303 becomes displaced relative to the fixed comb-tooth electrode 302.

It is to be noted that while an electret is formed at the fixed comb-tooth electrode 302 in the embodiments described above, it may be adopted in a structure with an electret formed at the movable comb-tooth electrode 303. Furthermore, it may be adopted in a structure in which a pair of comb-tooth electrodes are both allowed to move, as well as in a structure in which only either of the pair of comb-tooth electrodes is allowed to move.

An electromechanical converter may be realized as an actuator used to drive the shutter unit 404 shown in FIG. 17 or as an electret condenser microphone instead of as a power generation device. The electret element according to the embodiments described above are distinguishable from the electret disclosed in PTL3 which holds alkali metal ions, and thus, it can be used in conjunction with a CMOS device. For instance, it allows some of the circuit elements in the control unit 402 in FIG. 17 to be formed in the Si layer (device layer) at the pedestal 301. Such circuit elements include, for instance, transistors for driving circuit, FETS and resistors for a microphone amplifier circuit or a sensor amplifier circuit, and rectifier diodes for a power generation element.

While the electrodes 302 and 303 in the second embodiment described earlier assume a comb structure, they may instead assume a parallel plate structure with a variable gap distance. An electret element with such parallel plate electrodes can be used in applications as a parallel plate vibration energy harvesting device or a parallel plate condenser microphone.

Moreover, while the charge processing is executed in the embodiments described above by heating the entire device that includes the fixed comb-tooth electrode 302 and the movable comb-tooth electrode 303, only the regions involved in the electret formation (i.e., the SiO₂ layer to be charged and the Si layer through which an electric current is to flow) may be selectively heated with a laser or the like. In such a case, the present invention can be adopted in a device such as an electret microphone with a built-in amplifier circuit.

It is to be noted that the embodiments described above simply represent examples and do not impose any limits or restrictions with respect to the correspondence between the description of the embodiments and the description in the claims when interpreting the present invention.

The disclosure of the following priority application is herein incorporated by reference:
Japanese Patent Application No. 2015-26839 filed Feb. 13, 2015

REFERENCE SIGNS LIST 101, 202, 203, 311a, 311b . . . Si layer, 102, 201 . . . SiO₂ layer, 204, 205, 306, 308 . . . Si/SiO₂ interface, 300 . . . vibration energy harvesting device, 301 . . . pedestal, 302 . . . fixed comb-tooth electrode, 303 . . . movable comb-tooth electrode, 304 . . . weight, 305 . . . elastic support portion, 310, 310a, 310b . . . oxide film, 320 . . . load, 400 . . . MEMS shutter, 401 . . . voltage source, 402 . . . control unit, 404 . . . shutter unit, G . . . gap space

The invention claimed is:

1. An electret element, comprising:
    an Si layer,
    an SiO₂ layer formed at a surface of the Si layer; and
    an electret formed at the SiO₂ layer near an interface of the SiO₂ layer and the Si layer,
    wherein a negative charge constituting the electret is fixed in the SiO₂ layer near the interface of the SiO₂ layer and the Si layer,
    wherein a positive charge is accumulated in the Si layer near the interface of the SiO₂ layer and the Si layer,
    wherein an electric double layer formed with the negative charge and the positive charge is formed entirely through the interface of the SiO₂ layer and the Si layer so that no electric field is allowed to extend beyond the electric double layer, and
    wherein there is no electric charge near a surface of the SiO₂ layer which is opposite the interface of the SiO₂ layer and the Si layer.

2. An electromechanical converter providing a first electrode and a second electrode disposed so as to face opposite each other, at least one of which is allowed to move, wherein:
    the first electrode constitutes the electret element according to claim 1; and
    electric energy is converted to mechanical energy and vice versa as at least either the first electrode or the second electrode moves.

3. The electromechanical converter according to claim 2, wherein:
    the Si layer constitutes an Si substrate; and
    at least a part of a circuit element used to drive the electromechanical converter is formed at the Si substrate.

4. The electromechanical converter according to claim 2, wherein:
    power is generated as at least either the first electrode or the second electrode is caused to move by an external force.

5. The electromechanical converter according to claim 2, further comprising:
- a stationary unit having the first electrode disposed thereat,
- a movable unit having the second electrode disposed thereat,
- a voltage source that applies a voltage between the first electrode and the second electrode; and
- a control unit that drives the movable unit by controlling the voltage applied by the voltage source.

6. A method for manufacturing an electret element, comprising:
- applying a voltage between an Si layer, with an $SiO_2$ layer formed thereat, and the $SiO_2$ layer while sustaining the Si layer at a first temperature at which the $SiO_2$ layer is rendered in a semiconductor state; and
- changing temperatures at the Si layer with the $SiO_2$ layer formed thereat from the first temperature to a second temperature at which the $SiO_2$ layer regains an insulating property in a state of continuous voltage application,
- wherein an electret is formed at the $SiO_2$ layer near an interface of the $SiO_2$ layer and the Si layer,
- a negative charge constituting the electret is fixed in the $SiO_2$ layer near the interface of the $SiO_2$ layer and the Si layer,
- a positive charge is accumulated in the Si layer near the interface of the $SiO_2$ layer and the Si layer, and
- an electric double layer formed with the negative charge and the positive charge is formed entirely through the interface of the $SiO_2$ layer and the Si layer so that no electric field is allowed to extend beyond the electric double layer, and
- wherein there is no electric charge near a surface of the $SiO_2$ layer which is opposite the interface of the $SiO_2$ layer and the Si layer.

7. The electromechanical converter according to claim 3, wherein:
- power is generated as at least either the first electrode or the second electrode is caused to move by an external force.

8. The electromechanical converter according to claim 3, further comprising:
- a stationary unit having the first electrode disposed thereat,
- a movable unit having the second electrode disposed thereat,
- a voltage source that applies a voltage between the first electrode and the second electrode; and
- a control unit that drives the movable unit by controlling the voltage applied by the voltage source.

* * * * *